United States Patent
Mushiake et al.

[11] Patent Number: 6,128,120
[45] Date of Patent: *Oct. 3, 2000

[54] SCANNING OPTICAL SYSTEM

[75] Inventors: Nobuo Mushiake; Shigeru Sawamura; Shunta Takimoto, all of Osaka, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/806,025

[22] Filed: Feb. 24, 1997

[30]    Foreign Application Priority Data

Feb. 28, 1996  [JP]  Japan ................... 8-041668
Feb. 29, 1996  [JP]  Japan ................... 8-042905
Feb. 29, 1996  [JP]  Japan ................... 8-042922
Feb. 29, 1996  [JP]  Japan ................... 8-042924
Feb. 29, 1996  [JP]  Japan ................... 8-042926

[51] Int. Cl.$^7$ ............................... G02B 26/08
[52] U.S. Cl. ................. 359/221; 359/212; 359/214; 359/215; 359/210; 359/205; 359/206
[58] Field of Search ................... 359/196–226; 250/234–236; 348/96–101, 104, 108–109, 195, 196, 203; 358/474, 483, 494, 505, 513; 347/243, 244, 258–261

[56]    References Cited

U.S. PATENT DOCUMENTS 4,126,386  11/1978  Fritzler .
4,259,004   3/1981  Tateoka et al. .
4,861,983   8/1989  Sasada et al. ................. 250/235
5,067,782  11/1991  Morimoto et al. .............. 359/205

FOREIGN PATENT DOCUMENTS 62047278  of 0000  Japan .

*Primary Examiner*—James Phan
*Attorney, Agent, or Firm*—Price, Gess & Ubell

[57]    ABSTRACT

A scanning optical system is used to re-form an original image on a CCD line sensor. The optical system has an object side lens unit, a mirror and an image side lens unit. The object side lens unit condenses light from the object. The mirror is arranged between the object side lens to deflect the light having passed through the object side lens unit for scanning. An exit pupil of the object side lens unit coincide with an entrance pupil of the image side lens unit.

26 Claims, 20 Drawing Sheets

SCANNING OPTICAL SYSTEM

BACKGROUND OF THE INVENTION

1. Field of the Invention

The present invention relates to a scanning optical system, for example, to a scanning optical system for use in apparatuses such as film scanners capable of high-speed image capture.

2. Description of the Prior Art

Various types of film scanners have been proposed. Of them, a film scanner of mirror-scan type is well known. The mirror-scan type film scanner is constituted of a line sensor (e.g. line charge coupled device (CCD)) having its light receiving devices arranged in a sub scanning direction, a scanning optical system for imaging film images on the line sensor, and a mirror being swingingly rotated for main scanning.

The above-described type of film scanner faces a problem that since the film image plane to be scanned is flat, when it is scanned, the optical path length between the mirror and the scanned image plane changes as the mirror rotates. To solve this problem, Japanese Published Patent Application No. S62-20526 discloses a scanning apparatus which achieves high-speed scanning of flat image planes without causing any curvature by disposing a rotationally asymmetrical imaging optical system having a desirable Petzval sum between the mirror and the scanned image plane to correct the optical path length.

However, the imaging optical system used in the scanning apparatus of Japanese Published Patent Application No. S62-20526 is an expensive optical system having a surface configuration which is difficult to manufacture, so that the cost of the scanning apparatus rises. In addition, since it is inevitable to use a large-size mirror, it is difficult to rotate the mirror at high speed, so that it takes ten seconds to several minutes to capture the image of one frame of the film.

In the scanning optical system of mirror-scan type, the mirror is swingingly rotated for scanning, so that a biased load is imposed on the bearing of the mirror every time scanning is performed. As a result, the bearing of the mirror is biasedly worn or partially out of oil. In addition, the driving apparatus (e.g. galvanic apparatus) for swingingly rotating the mirror is expensive and is a cause of the complication of the scanning apparatus.

SUMMARY OF THE INVENTION

An object of the present invention is to provide a scanning optical system enabling high-speed scanning without causing any curvature even if the surface to be scanned is flat, and reducing the biased load imposed on the bearing of the mirror without increasing the complexity and cost of the scanning apparatus.

To achieve the above-mentioned object, a scanning optical system according to one aspect of the present invention is provided with an object side lens unit, a deflector for deflecting light passing through the object side lens unit to perform scanning for taking in a primary image formed on an object side surface, said deflector being disposed in a vicinity of an exit pupil of the object side lens unit, and an image side lens unit for focusing on an image side surface both axial and off-axial rays with respect to a sub-scanning direction, said image side lens unit being provided so that an entrance pupil thereof substantially coincides with an exit pupil of the object side lens unit.

In a scanning optical system according to another aspect of the present invention, a primary image formed on an object side surface is projected on an image plane as a secondary image by a lens system by performing scanning, and the scanning is performed by moving the entire lens system relatively to the object side surface and to the image plane and vertically to an optical axis of the lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
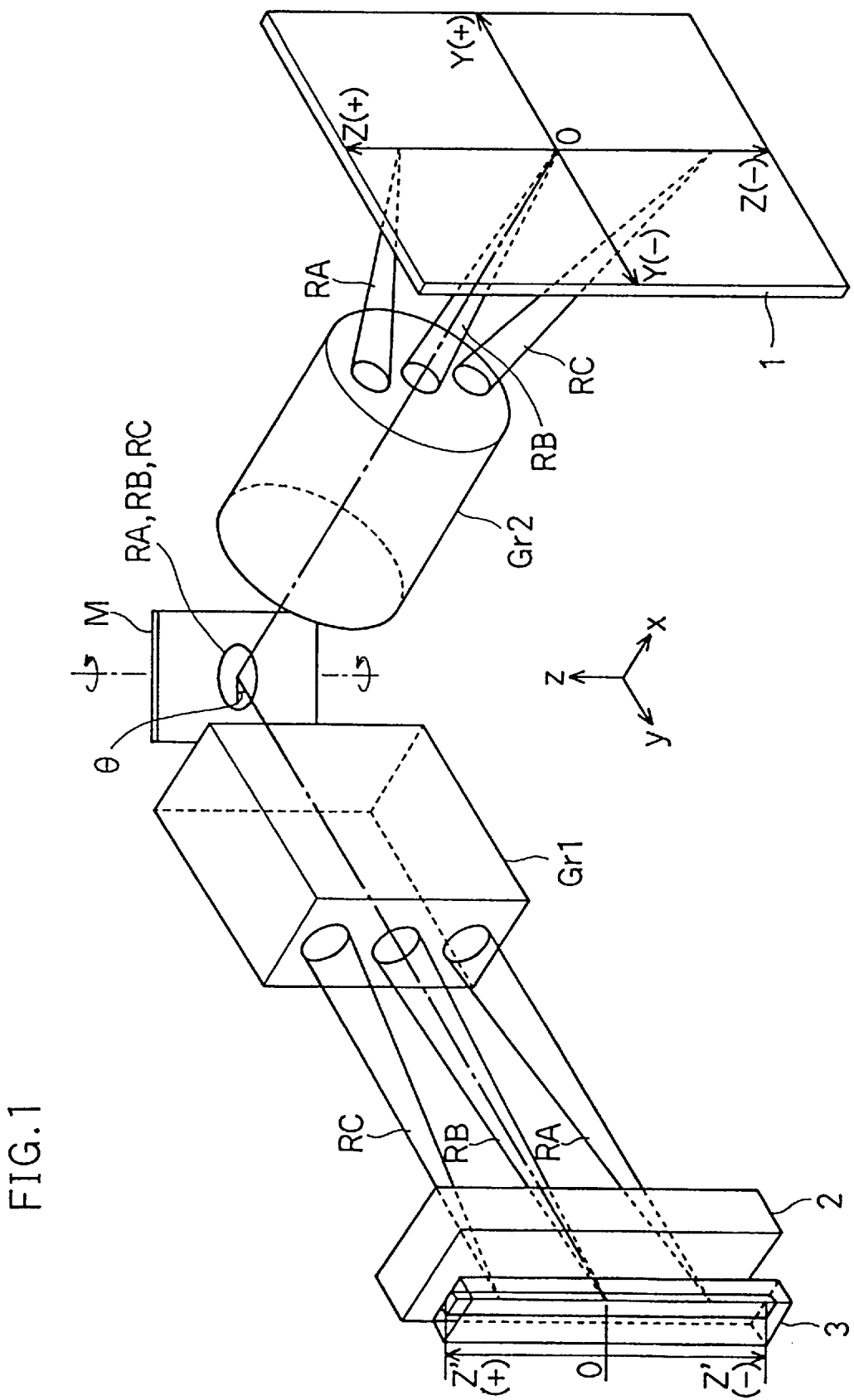
FIG. 1 is a perspective view schematically showing a basic arrangement of first to fifth embodiments of the present invention.

Hereinafter, a scanning optical system embodying the present invention will be described with reference to the drawings in which the X-axis, the Y-axis and the Z-axis are axes perpendicular to one another. FIG. 1 shows a basic arrangement of a scanning optical system common to first to fifth embodiments of the present invention. The scanning optical system is a mirror-scan type scanning optical system having, from the image side, an image side lens unit Gr1, a mirror M and an object side lens unit Gr2. On the object side of the scanning optical system, a film image plane 1 is disposed in a fixed position during the image capture. On the image side of the scanning optical system, a line CCD 3 and a prism (or a filter) 2 are disposed. The prism 2 which is a color separation prism used for three-plate color separation is unnecessary when color separation is not performed.

The object side lens unit Gr2 (in this part of the lens system, the optical axis is in parallel with the X-axis) condenses light from the film image plane 1. In FIG. 1, RB is an axial light in the main and sub scanning directions, RA is an off-axial light at an object height Z(+) and an image height Z'(−) in the sub scanning direction, and RC is an off-axial light at an object height Z(−) and an image height Z'(+) in the sub scanning direction. The plane-form mirror M performs main scanning of the film image plane 1 by deflecting light having passed through the object side lens unit Gr2. The deflection is performed by rotating the mirror M. The main scanning of the film image plane 1 is performed in the direction of the Y-axis. The image side lens unit Gr1 (in this part of the lens system, the optical axis is in parallel with the Y-axis) images on the image side surface of the line CCD 3 both the axial light and the off-axial light in the sub scanning direction (the direction of the Z-axis) deflected by the mirror M. The image formed on the image side surface of the lines CCD 3 is an image in the sub scanning direction (the direction of the Z-axis) on the film image plane 1 and is captured line by line as image information by the line CCD 3.

The lens elements included in the object side lens unit Gr2 have their y-z cross sections formed circular so that the luminous flux is covered with respect to both the Y- and Z-axes. On the other hand, the lens elements included in the image side lens unit Gr1 have their x-z cross sections formed elongated along the Z-axis because the luminous flux is necessarily covered only with respect to the sub scanning direction (the direction of the Z-axis) which is the direction in which the light receiving devices of the line CCD 3 are arranged. By thus forming the image side lens unit Gr1 to be elongated, the space in the scanning apparatus is saved.

While the line CCD 3 is used as the image capturing portion in the present scanning optical system, another type of line sensor may be used as the image capturing portion instead of the line CCD 3, or a photoreceptor drum may be used as the image capturing portion. In a case where a photoreceptor drum is used, the photoreceptor drum is disposed so that its generatrix is in parallel with the sub scanning direction, and the rotation of the photoreceptor drum is synchronized with the rotation of the mirror M.

While the present scanning optical system is applied to a film scanner, the scanning optical system of the present invention is applicable to other scanning apparatuses. For example, instead of the line CCD 3, an apparatus (e.g. a light emitting diode (LED) array or a transmission-type liquid crystal display (LCD) panel) may be disposed which emits light including image information, and instead of the film image plane 1, a light receiving apparatus (e.g. an area CCD or a plane-form photoreceptor) may be provided which receives, reads and records light including image information. In this case, the image side lens unit Gr1 is the object side lens unit and the object side lens unit Gr2 is the image side lens unit.

Figure 2:
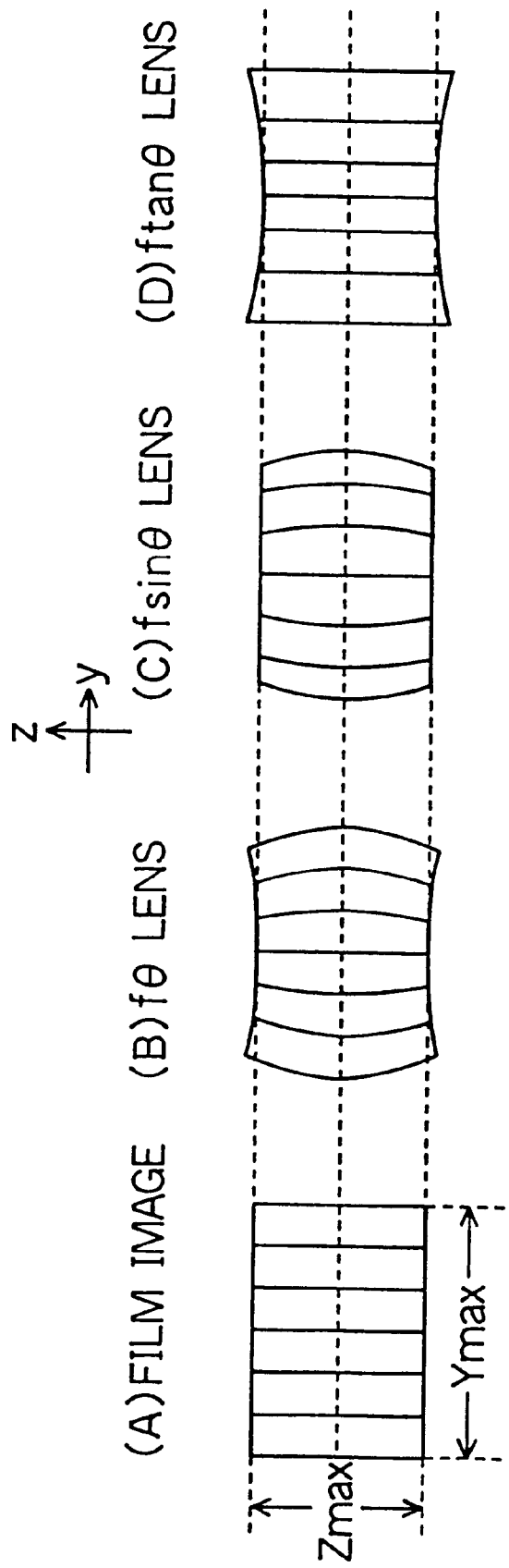
FIG. 2 is a view of assistance in explaining the relationship between the image plane and the projection methods of an object side lens unit in the embodiments of FIG. 1.

Next, image distortions will be described which are caused by different projection methods of the object side lens unit Gr2. (A) of FIG. 2 shows a film image on the film image plane 1 (FIG. 1). Ymax is a main scanning range and Zmax is a sub scanning range. (B) to (D) of FIG. 2 show images of the film image formed in the position of the image side surface of the line CCD 3 when the main scanning of the film image plane 1 is performed by rotating the mirror M at a uniform angular velocity by use of object side lens units Gr2 of various projection methods. The image shown in (B) of FIG. 2 is obtained when an fθ lens is used as the object side lens unit Gr2. The image shown in (C) of FIG. 2 is obtained when an fsinθ lens is used as the object side lens unit Gr2. The image shown in (D) of FIG. 2 is obtained when an ftanθ lens is used as the object side lens unit Gr2.

According to the fθ system ((B) of FIG. 2), since the intervals in the main scanning direction (the direction of the Y-axis) are the same, it is unnecessary to correct the rotation speed of the mirror M. However, it is necessary to two-dimensionally correct the image with respect to both the main and sub scanning directions (the directions of Y- and Z-axes). According to the fsinθ system ((C) of FIG. 2) and the ftanθ system ((D) of FIG. 2), although it is necessary to correct the rotation speed of the mirror M since the intervals in the main scanning direction are different, the necessary image correction is one-dimensional. According to the fθ system and the fsinθ system, however, since distortion is caused which is curved in the main scanning direction (the direction of the Y-axis), it is difficult to project on the image side surface of the line CCD 3 all the line images on the corresponding film image plane 1.

In the present scanning optical system, an ftanθ optical system is used as the object side lens unit Gr2. In the case of the ftanθ system, when the main scanning of the film image plane 1 is performed by deflecting the light with the mirror M, the optical path in the object side lens unit Gr2 changes and the projection changes accordingly. That is, according to the projection method of the ftanθ system, as shown in (D) of FIG. 2, the farther the light deflected by the mirror M is away from the optical axis in the main scanning direction (the direction of the Y-axis), the farther the light incident on the object side lens unit Gr2 is away from the optical axis than it should be, so that the image is distorted in the main scanning direction. The change in projection in the main scanning direction is eliminated by correcting the speed of scanning by the mirror M. Therefore, in the present scanning optical system, the image is prevented from being distorted in the main scanning direction by increasing the main scanning speed as the light deflected by the mirror M becomes farther away from the optical axis. High-speed scanning without any distortion in the main scanning direction is thus enabled.

On the other hand, in the sub scanning, the farther the light deflected by the mirror M is away from the optical axis in the main scanning direction, the farther the light incident on the object side lens unit Gr2 is away from the optical axis than it should be, so that the image is distorted in the sub scanning direction. The change in projection in the sub scanning direction is eliminated by one-dimensionally correcting the image with respect to the sub scanning direction. Therefore, in the present scanning optical system, the distortion of the image in the sub scanning direction is electrically corrected by processing the captured image. The above-described correction of the image with respect to the sub scanning direction is easily made since it is a correction with respect to the direction in which the light receiving devices of the line CCD 3 are arranged (i.e. the direction of the Z-axis). High-speed scanning without any distortion in the sub scanning direction is thus enabled.

In the present scanning optical system, the deflection for the main scanning is performed by rotating the mirror M like in conventional mirror-scan type scanning optical systems. However, the mirror M is not only swingingly rotated. That is, since a space which enables a 360-degree rotation of the mirror M is provided between the object side lens unit Gr2 and the image side lens unit Gr1, by rotating the mirror M 360 degrees, the bearing of the mirror M is prevented from continuously receiving a biased load. The 360-degree rotation of the mirror M may be made, for example, every main scanning, every time the main scanning is performed a predetermined number of times, or only at start-up (i.e. when the power of the scanning apparatus is turned on).

By thus reducing the biased load imposed on the bearing of the mirror M, the bearing of the mirror M is prevented from being biasedly worn or from being partially out of oil. In addition, since it is unnecessary to use a driving apparatus (e.g. galvanic apparatus) for swingingly rotating the mirror M and the 360-degree rotation of the mirror M is made with a driving apparatus (e.g. driving apparatus comprising a DC motor) which is less expensive and simpler in structure, the cost reduction and the simplification of the structure of the scanning apparatus are achieved.

Figure 3:
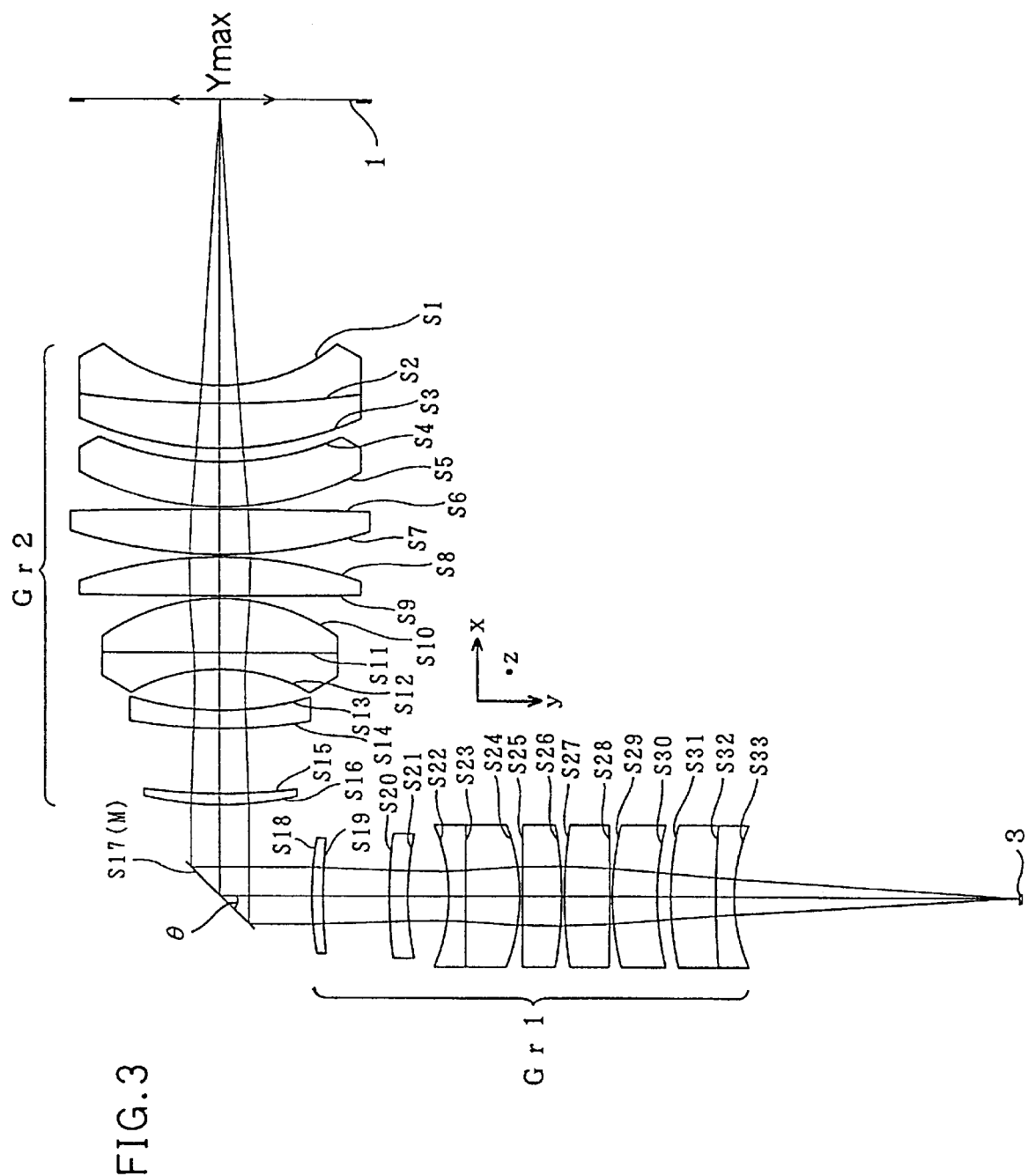
FIG. 3 shows the lens arrangement of the first embodiment at a mirror rotation angle θ of 45 degrees.
Figure 4:
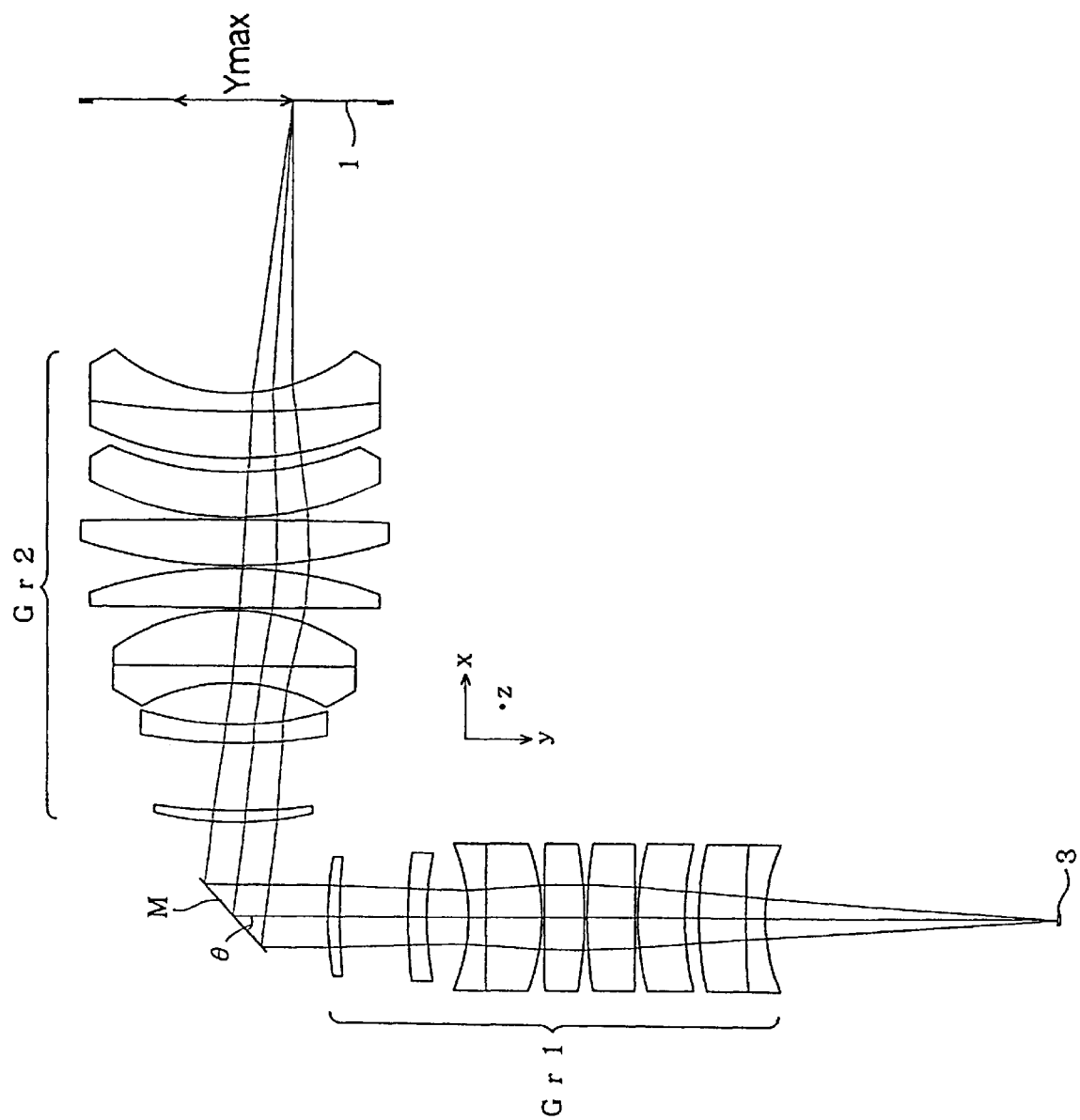
FIG. 4 shows the lens arrangement of the first embodiment at a mirror rotation angle θ of 48.5 degrees.
Figure 5:
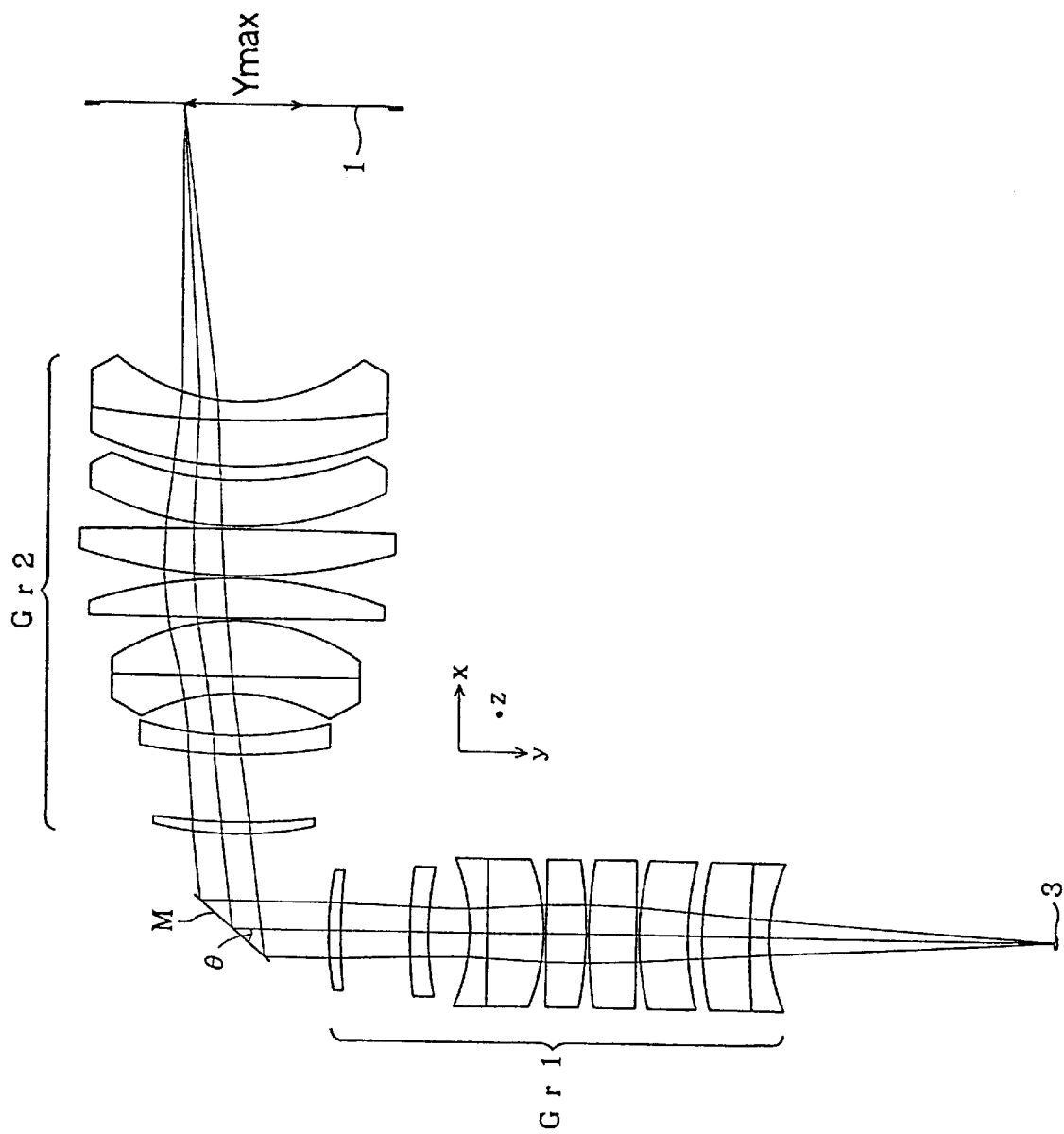
FIG. 5 shows the lens arrangement of the first embodiment at a mirror rotation angle θ of 41.5 degrees.
Figure 6:
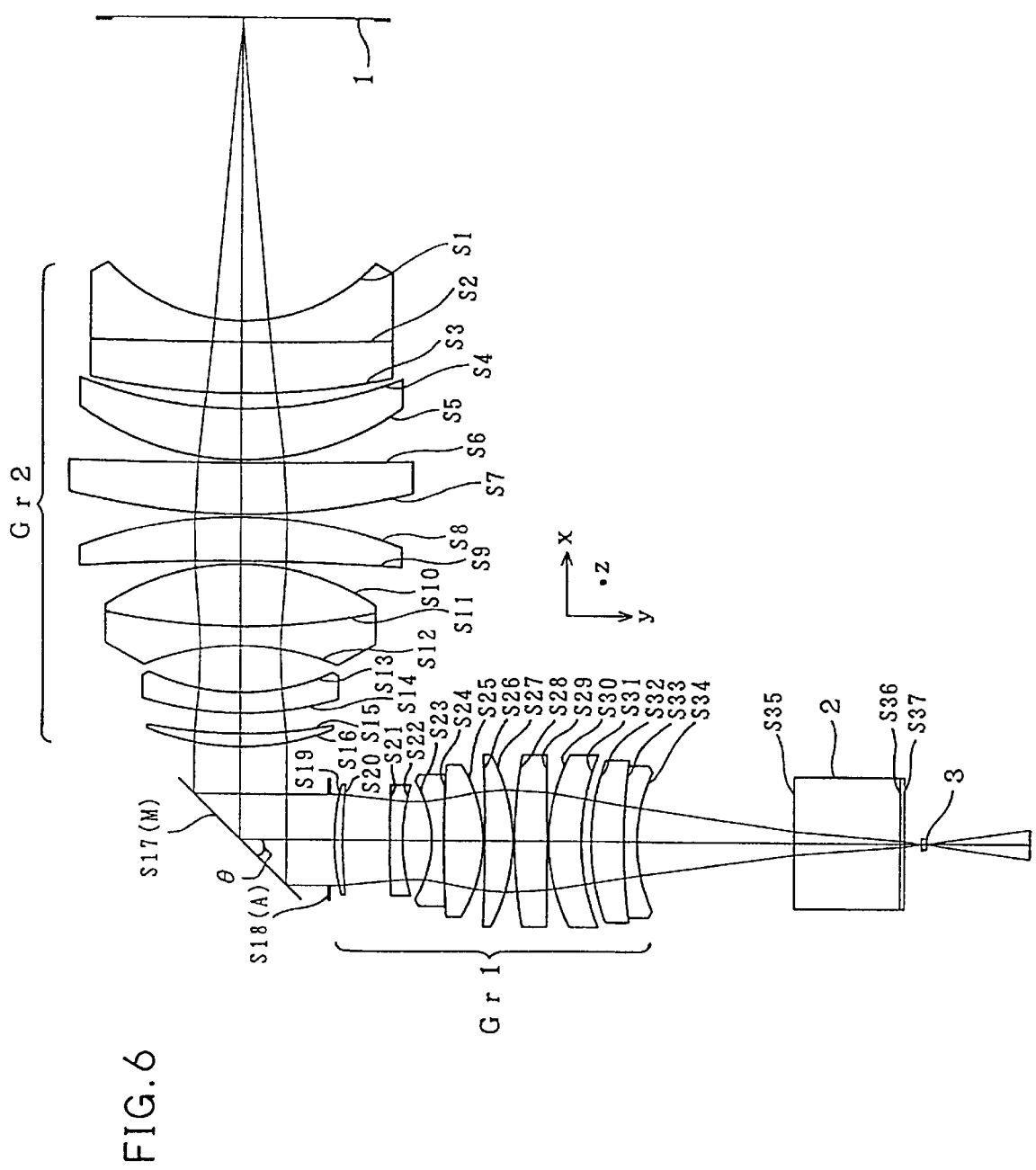
FIG. 6 shows the lens arrangement of the second embodiment at a mirror rotation angle θ of 45 degrees.
Figure 7:
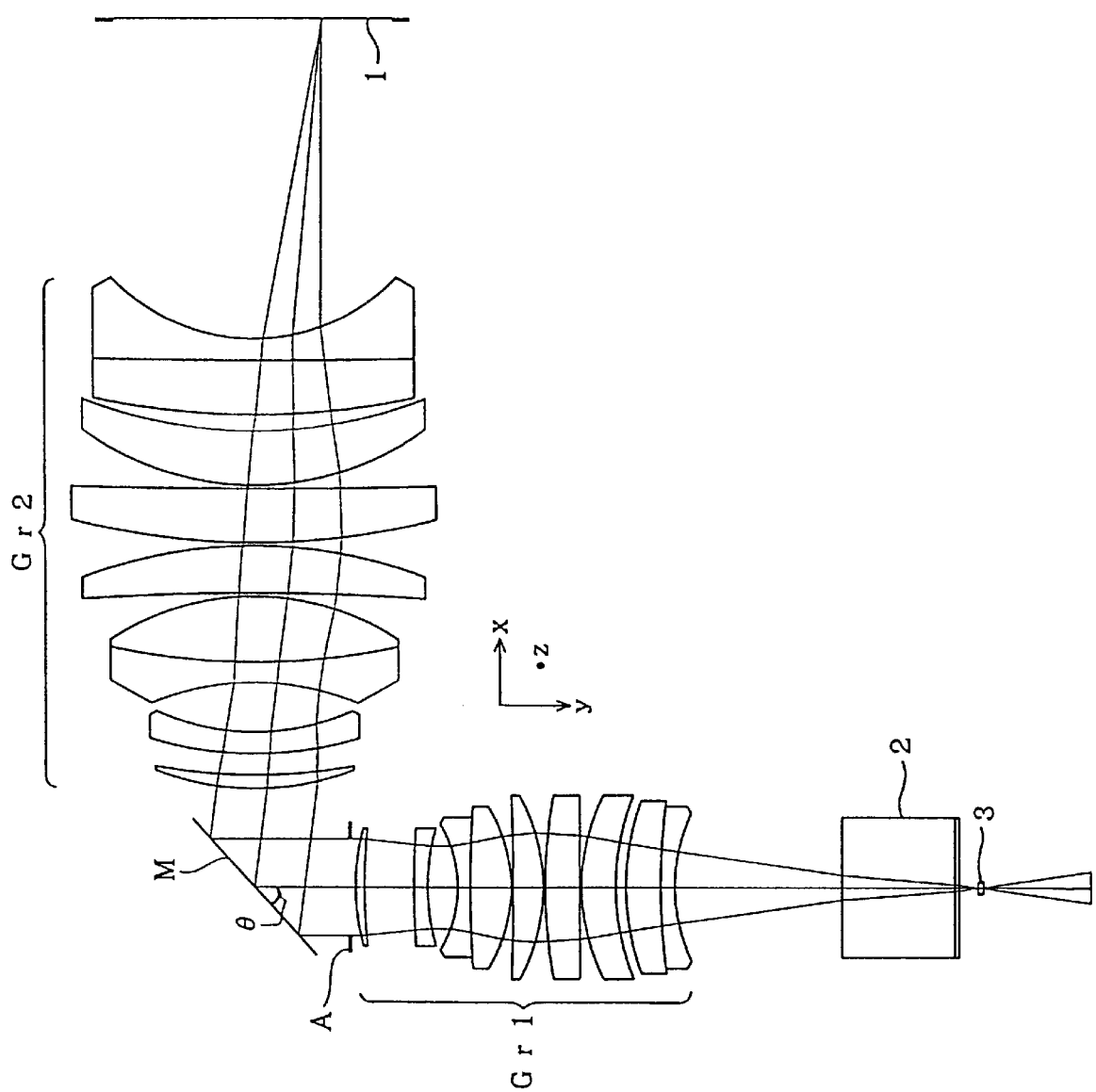
FIG. 7 shows the lens arrangement of the second embodiment at a mirror rotation angle θ of 48.5 degrees.
Figure 8:
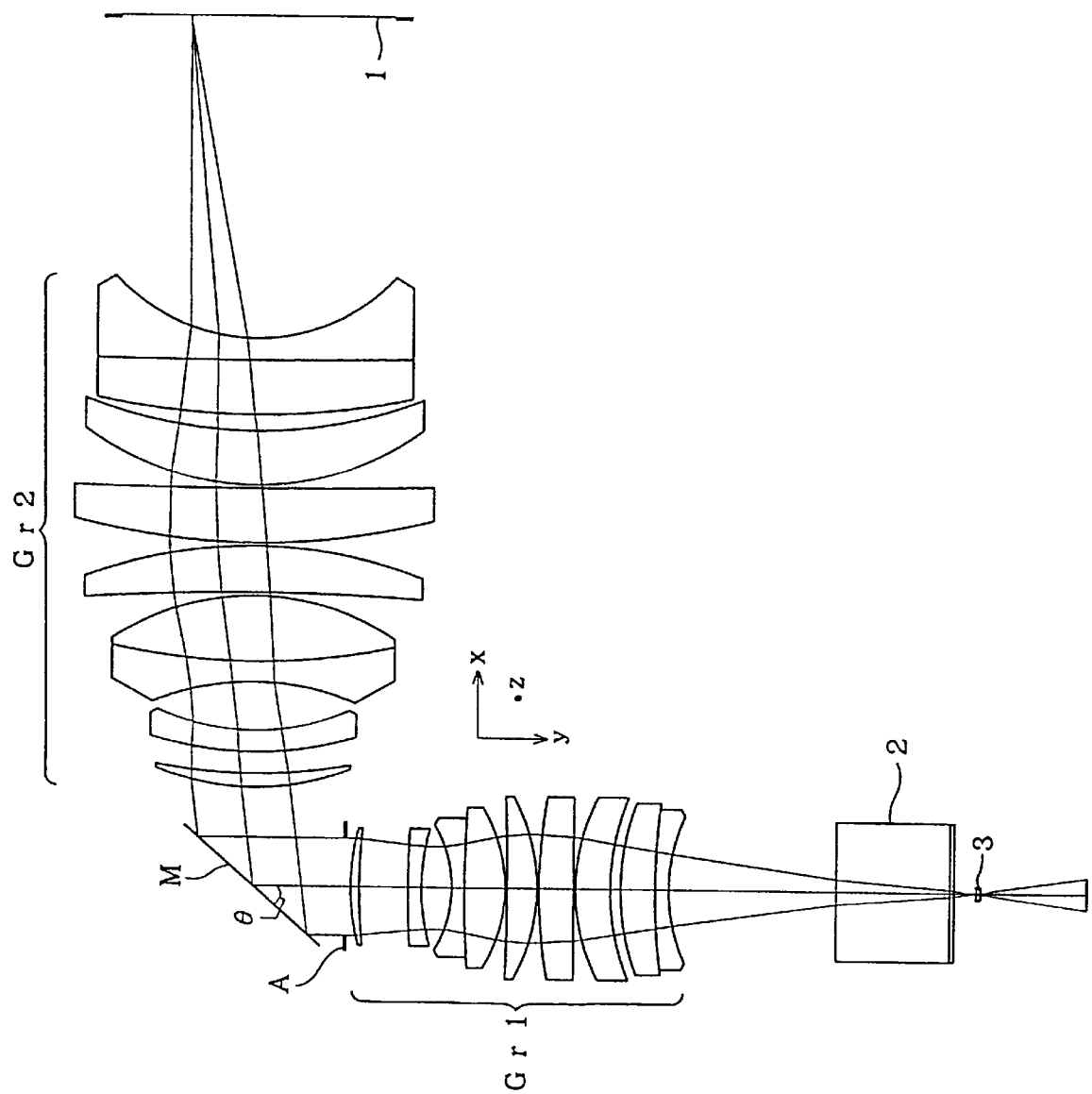
FIG. 8 shows the lens arrangement of the second embodiment at a mirror rotation angle θ of 41.5 degrees.
Figure 9:
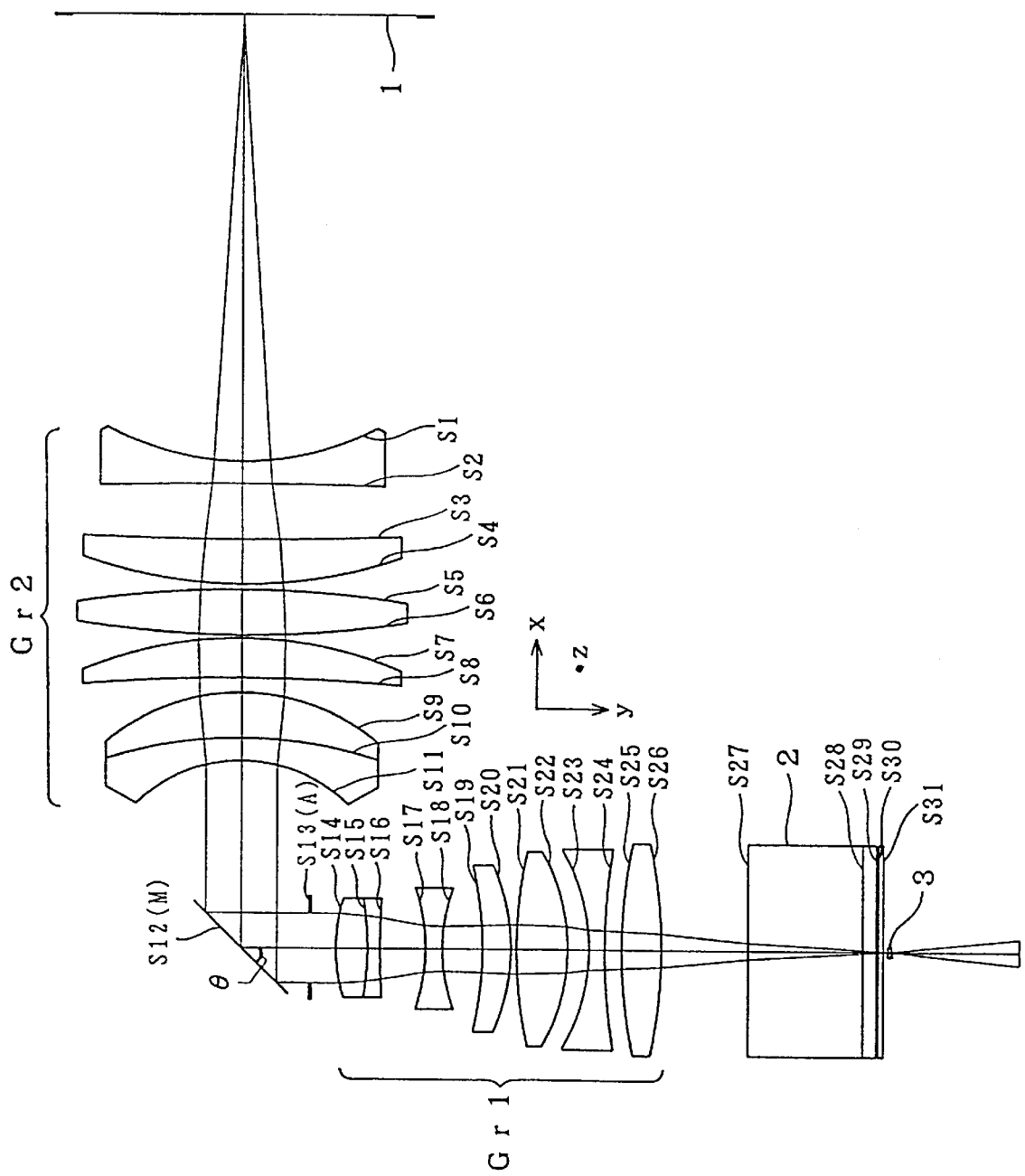
FIG. 9 shows the lens arrangement of the third embodiment at a mirror rotation angle θ of 45 degrees.
Figure 10:
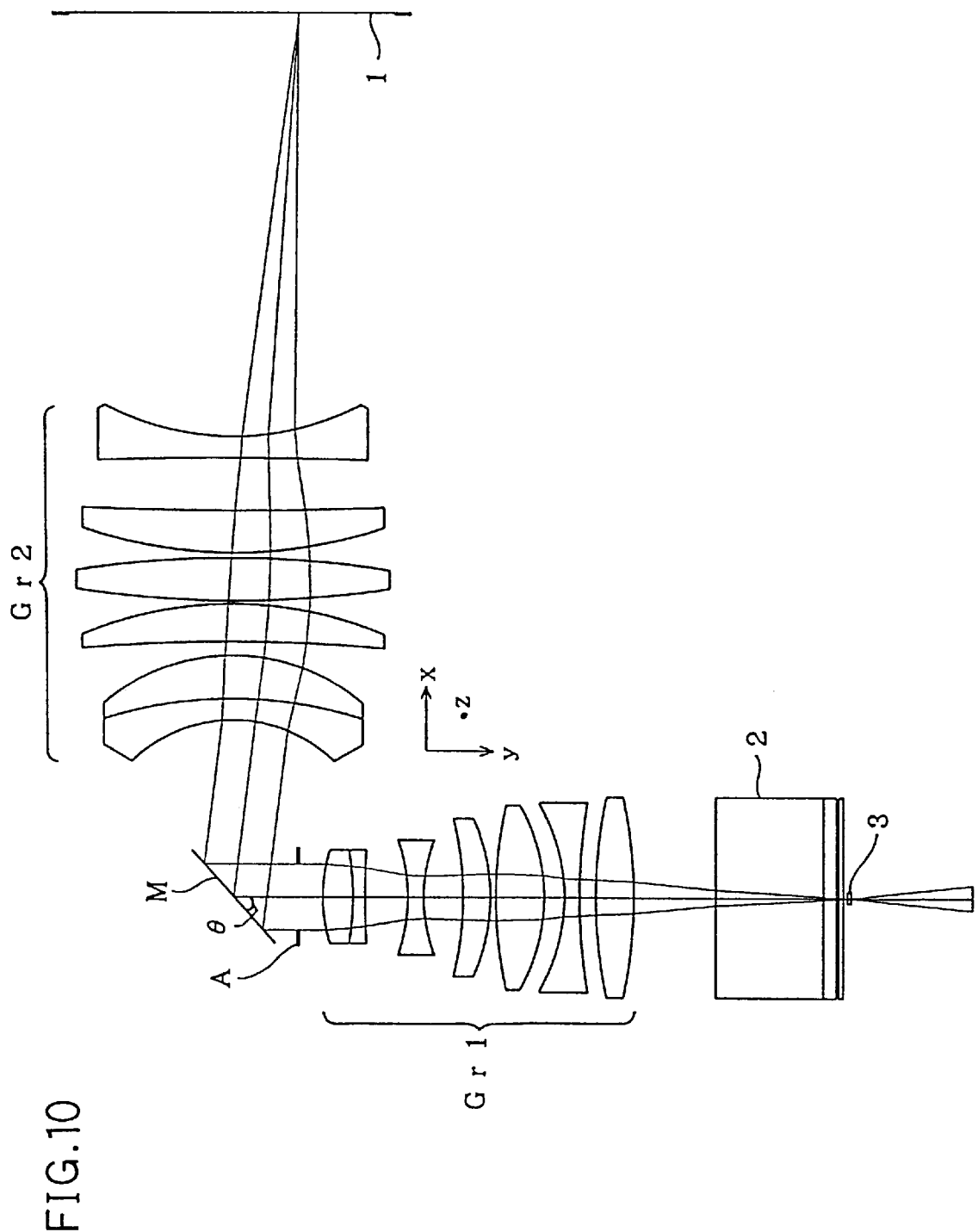
FIG. 10 shows the lens arrangement of the third embodiment at a mirror rotation angle θ of 48.5 degrees.
Figure 11:
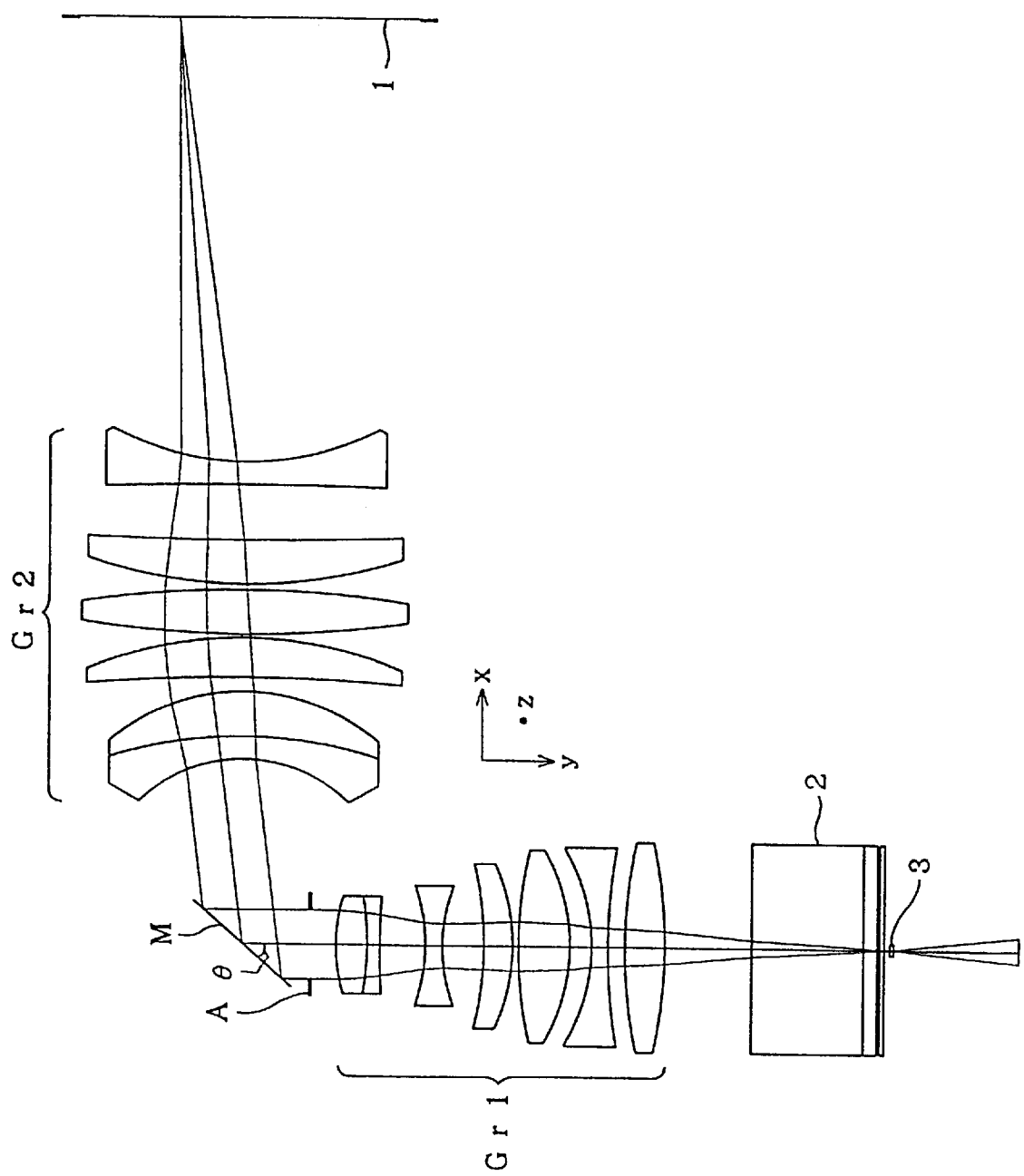
FIG. 11 shows the lens arrangement of the third embodiment at a mirror rotation angle θ of 41.5 degrees.

Next, the structure of the scanning optical system shown in FIG. 1 will be described in detail with reference to the first to third embodiments. FIGS. 3 to 5, FIGS. 6 to 8, and FIGS. 9 to 11 show x-y cross sections corresponding to the first to third embodiments, respectively. FIGS. 3, 6 and 9 show the optical path at a mirror rotation angle (i.e. mirror swing angle) $\theta$ of 45 degrees (at this time, the object height Y=0). FIGS. 4, 7 and 10 show the optical path at a mirror rotation angle $\theta$ of 48.5 degrees. FIGS. 5, 8 and 11 show the optical axis at a mirror rotation angle $\theta$ of 41.5 degrees. In the lens arrangements of FIGS. 3, 6 and 9, Si (i=1, 2, 3, . . . ) represents an ith surface counted from the object (film image plane 1) side.

First Embodiment

In the first embodiment shown in FIGS. 3 to 5, the image side lens unit Gr1 and the object side lens unit Gr2 each include nine rotationally symmetrical spherical lens elements, and adopts a symmetrical structure with respect to the mirror M which is advantageous to aberration correction. The image side lens unit Gr1 has its x-z cross section formed elongated. As described above, the space in the scanning apparatus is saved by forming the image side lens unit Gr1 to be elongated. In FIGS. 3 to 5, the object height Y corresponding to a range of $\theta$=45 degrees (FIG. 3) ±3.5 degrees is the main scanning range Ymax.

The first embodiment is arranged so that the exit pupil of the object side lens unit Gr2 and the entrance pupil of the image side lens unit Gr1 substantially coincide with each other. That the exit pupil of the object side lens unit and the entrance pupil of the image side lens unit substantially coincide with each other means that the exit pupil of the object side lens unit and the entrance pupil of the image side lens unit which lens units have substantially the same pupil diameter and are located substantially in the same position. In accordance with this definition, the arrangement where the exit pupil of the object side lens unit and the entrance pupil of the image side lens unit coincide with each other in an optical system where the optical axes of the object side lens unit and the image side lens unit coincide with each other will be described in further detail with respect to the following four cases in the order presented: (1) a case where the two pupils have substantially the same pupil diameter but are not located substantially in the same position; (2) a case where the two pupils are located substantially in the same position but do not have substantially the same pupil diameter; (3) a case where the two pupils have different pupil diameters and are located in different positions; and (4) the case of the first embodiment.

In the case (1), since the two pupils are not located substantially in the same position, for example when the axial light exits from the object side lens unit as divergent light, part of the axial light cannot pass through the entrance pupil of the image side lens unit, so that there is a loss in the quantity of the light. Conversely, when the axial light exits from the object side lens unit as convergent light, the area of the image side lens unit through which no light passes increases, so that the overall size of the optical system increases. In addition, when the exit pupil of the object side lens unit and the entrance pupil of the image side lens unit are not located substantially in the same position, not all of the off-axial light (i.e. light having an image height) having passed through the exit pupil of the object side lens unit can be incident on the entrance pupil of the image side lens unit.

In the case (2), since the exit pupil of the object side lens unit and the entrance pupil of the image side lens unit are located substantially in the same position, of the pupils, the one having a smaller diameter virtually restricts the light. Therefore, when the exit pupil of the object side lens unit has a greater diameter than the entrance pupil of the image side lens unit, not all of the light from the object side can be transmitted to the image side irrespective of whether the light is axial or off-axial. Conversely, when the entrance pupil of the image side lens unit has a greater diameter than the exit pupil of the object side lens unit, the area of the image side lens unit through which no light passes increases, so that the overall size of the optical system increases.

In the case (3), the exit pupil diameter of the object side lens unit and the entrance pupil diameter of the image side lens unit can appropriately be set so that the axial light is all transmitted from the object side lens unit to the image side lens unit. In this case, however, similarly to the case (1), if the exit pupil of the object side lens unit and the entrance pupil of the image side lens unit are not located substantially in the same position, not all of the off-axial light having passed through the exit pupil of the object side lens unit can be incident on the entrance pupil of the image side lens unit.

On the contrary, in the case (4) of the first embodiment, since the exit pupil of the object side lens unit Gr2 and the entrance pupil of the image side lens unit Gr1 substantially coincide with each other, the axial light and the off-axial light having passed through the exit pupil of the object side lens unit Gr2 are all incident on the entrance pupil of the image side lens unit Gr1 and are all transmitted from the object side lens unit Gr2 to the image side lens unit Gr1. Consequently, the axial light and the off-axial light in the sub scanning direction deflected by the mirror M are both imaged on the image side surface of the line CCD 3 by the image side lens unit Gr1.

For example, in a laser scanning optical system for use in printers, since the axial light and the off-axial light are both used in the main scanning direction, the mirror is disposed in the vicinity of the entrance pupil of the lens unit located on the image side. However, since the off-axial light is not used in the sub scanning direction (i.e. the off-axial light does not have an image height in the sub scanning direction), it is unnecessary that the pupils of the lens units corresponding to the object side lens unit Gr2 and the image side lens unit Gr1 of the first embodiment coincide with each other. On the contrary, in the first embodiment, since the axial light and the off-axial light in the sub scanning direction deflected by the mirror M are both imaged on the image side surface by the image side lens unit Gr1 (i.e. have an image height in the sub scanning direction), if the exit pupil of the object side lens unit Gr2 and the entrance pupil of the image side lens unit Gr1 do not substantially coincide with each other, not all of the off-axial light having passed through the exit pupil of the object side lens unit Gr2 can be incident on the entrance pupil of the image side lens unit Gr1.

By thus arranging the lens system so that the exit pupil of the object side lens unit Gr2 and the entrance pupil of the image side lens unit Gr1 substantially coincide with each other, the object side lens unit Gr2 and the image side lens unit Gr1 constitute one lens system having a common pupil. The object side lens unit Gr2 and the image side lens unit Gr1 each include only rotationally symmetrical spherical lens elements and have the field of curvature excellently corrected. Therefore, no curvature is caused in the image plane with respect to the entire scanning optical system. Since correction of field of curvature is easily made for each of the object side lens unit Gr2 and the image side lens unit Gr1, it is unnecessary to use an optical system having a complicated surface configuration, and the object side lens unit Gr2 and the image side lens unit Gr1 are formed only of rotationally symmetrical spherical lens elements which are inexpensive and easy to manufacture. By thus forming the object side lens unit Gr2 and the image side lens unit Gr1 of rotationally symmetrical spherical lens elements which are inexpensive and easy to manufacture, the cost reduction of the scanning apparatus is achieved. In addition, since the scanning optical system including only spherical lens elements is simple in structure, the rotation speed of the mirror M is readily increased. As a result, the image of one frame of the 135 film is captured in approximately 0.2 to one second.

The mirror M is small compared with ones provided in conventional scanning optical systems. However, since the mirror M is disposed in the vicinity of the pupils substantially coinciding with each other as described above, the light is all transmitted from the object side lens unit Gr2 to the image side lens unit Gr1. When the light is deflected by the mirror M disposed in the vicinity of the coinciding pupils, since the field of curvature of the lens units Gr1 and Gr2 is excellently corrected, no curvature is caused in the image plane formed on the image side surface of the line CCD 3. Consequently, even if the film image plane 1 to be scanned is flat, high-speed scanning without any curvature is achieved. The mirror M has only its central portion formed reflective and has the peripheral portion formed light-proof (or transmissive). Consequently, the mirror M functions as an aperture diaphragm for restricting the incident luminous flux according to the size and configuration of the reflective portion. While the present scanning optical system is arranged so that parallel light is incident on the mirror M, it may be arranged so that convergent or divergent light is incident on the mirror M.

When the main scanning of the film image plane 1 is performed by the mirror M, the optical path in the object side lens unit Gr2 changes. That is, in the main scanning direction, even if the light incident on the object side lens unit Gr2 is off-axial light, the light is incident on the image side lens unit Gr1 as axial light. However, since the object side lens unit Gr2 and the image side lens unit Gr1 each satisfy an image quality as an independent front aperture lens system with the mirror M functioning as the aperture diaphragm, a sufficient image quality is obtained with the entire scanning optical system.

Second Embodiment

In the second embodiment shown in FIGS. 6 to 8, the image side lens unit Gr1 and the object side lens unit Gr2 each include nine rotationally symmetrical spherical lens elements, and adopts a symmetrical structure with respect to the mirror M which is advantageous to aberration correction. This embodiment is suitable for color separation because the prism 2 is provided on the side of the line CCD 3.

In this embodiment, the exit pupil of the object side lens unit Gr2 and the entrance pupil of the image side lens unit Gr1 substantially coincide with each other like in the above-described first embodiment and the same advantages are obtained. Since the object side lens unit Gr2 and the image side lens unit Gr1 each satisfy an image quality as an independent front aperture lens system with an aperture diaphragm A functioning as a front aperture, a sufficient image quality is obtained with the entire scanning optical system like in the first embodiment.

The second embodiment is characterized in that the aperture diaphragm A is disposed in the vicinity of the substantially coinciding pupils and the mirror M is disposed between the object side lens unit Gr2 and the aperture diaphragm A. In the case where the main scanning of the film image plane 1 is performed by deflecting the light with the mirror M, if the mirror M functions as the aperture diaphragm for restricting the luminous flux like in the first embodiment, the projection changes with a change in angle between the mirror M and the luminous flux. The quantity of the light incident on the image side lens unit Gr1 changes with the change of the projection. For example, the quantity of the light received by the mirror M increases as the mirror rotation angle $\theta$ increases, and conversely, the quantity of the light received by the mirror M decreases as the mirror rotation angle $\theta$ decreases. Consequently, nonuniformity of light quantity is caused in the image captured by the line CCD 3.

According to the arrangement of the second embodiment, since a wholly reflective mirror M is disposed between the object side lens unit Gr2 and the aperture diaphragm A, the luminous flux is restricted not by the mirror M but by the aperture diaphragm A, so that the quantity of the light incident on the image side lens unit Gr1 is uniform. As a result, the illuminance distribution (i.e. the illuminance distribution on the image side surface of the line CCD 3) is prevented from deteriorating. In the case where the aperture diaphragm A is disposed between the object side lens unit Gr2 and the mirror M, the luminous flux is eclipsed in the main scanning.

The image side lens unit Gr1 is substantially telecentric to the image side and is therefore suitable for an arrangement where a line sensor such as a multi-plate (e.g. three-plate) line CCD is used as the image capturing portion. This is because the more telecentric the image side lens unit Gr1 is to the image side, the more excellently the angle characteristic matches with that of the dichroic film of the multi-color separation prism (e.g. three-color separation prism). In the case where the light incident on the object side lens unit Gr2 forms an angle to the optical axis, the illuminance distribution deteriorates according to the cosine fourth law. However, the object side lens unit Gr2 is substantially telecentric to the object side and is therefore advantageous in preventing the illuminance distribution from deteriorating. Please note that the image side lens unit Gr1 and the object side lens unit Gr2 are telecentric lens systems also in the above-described first embodiment.

Third Embodiment

The third embodiment shown in FIGS. 9 to 11 has a more practical arrangement than the first and second embodiments although its basic arrangement and advantages are the same as those of the above-described second embodiment. The third embodiment includes a fewer number of lens elements. The image side lens unit Gr1 includes seven rotationally symmetrical spherical lens elements and the object side lens unit Gr2 includes six rotationally symmetrical spherical lens elements. This embodiment is suitable for color separation because the prism 2 and a cover glass are provided on the side of the line CCD 3.

Tables 1 to 3 show construction data of the first to third embodiments (FIGS. 3 to 5, FIGS. 6 to 8, and FIGS. 9 to 11). In each table, Si (i=1, 2, 3, . . . ) represents an ith surface counted from the object side, ri (i=1, 2, 3, . . . ) represents the radius of curvature of an ith surface Si counted from the object side, di (i=1, 2, 3, . . . ) represents an ith axial distance counted from the object side, and Ni (i=1, 2, 3, . . . ) represents a refractive index (Nd) to the d-line of an ith lens counted from the object side. These tables also show the focal length f of the entire lens system and the image side effective F-number EFFNO at a mirror rotation angle θ of 45 degrees (at this time, the object height Y=0). Table 4 shows mirror rotation angles θ (degrees) and corresponding object heights Y (millimeters).

As described above, in the first to third embodiments, since the exit pupil of the object side lens unit Gr2 and the entrance pupil of the image side lens unit Gr1 substantially coincide with each other, high-speed scanning without any curvature is achieved even when the surface to be scanned is flat. In addition, since the object side lens unit Gr2 and the image side lens unit Gr1 are formed only of rotationally symmetrical spherical lens elements which are inexpensive and easy to manufacture, the cost is low. Therefore, by using the scanning optical system of the first to third embodiments, the cost of the scanning apparatus is effectively reduced. According to the arrangement of the first embodiment, since the size of the mirror is reduced, the size reduction of the scanning apparatus is effectively achieved. According to the arrangements of the second and third embodiments, since the illuminance distribution is prevented from deteriorating by the aperture diaphragm A, high-quality images are obtained where there is no nonuniformity of light quantity.

In the arrangement where the object side lens unit Gr2 and the image side lens unit Gr1 each satisfy an image quality as an independent front aperture lens system, a sufficient image quality is obtained with the entire scanning optical system, so that higher-quality images are obtained. Since the more telecentric the image side lens unit Gr1 is to the image side, the more suitable the scanning optical system is for color separation, and the more telecentric the object side lens unit Gr2 is to the object side, the more the illuminance distribution is prevented from deteriorating, high-quality images are obtained where there is further no nonuniformity of light quantity.

Additionally, in the first to third embodiments, since the ftanθ optical system is used as the object side lens unit Gr2 so that the main scanning speed increases as the light deflected by the mirror M in the main scanning becomes farther away from the optical axis, high-speed scanning without any distortion is achieved. Since a space for the mirror M to rotate 360 degrees is provided between the object side lens unit Gr2 and the image side lens unit Gr1 so that the deflection for the main scanning is performed by rotating the mirror M, the biased load imposed on the bearing of the mirror is reduced. Consequently, the bearing of the mirror M is prevented from being biasedly worn or partially out of oil. Since it is unnecessary to use a driving apparatus (e.g. galvanic apparatus) for swingingly rotating the mirror M and a driving apparatus (e.g. a driving apparatus comprising a DC motor) which is inexpensive and simple in structure may be used, the cost reduction and the simplification of the structure of the scanning apparatus are achieved.

<Optical Arrangement Common to Fourth and Fifth Embodiments>

Figure 12:
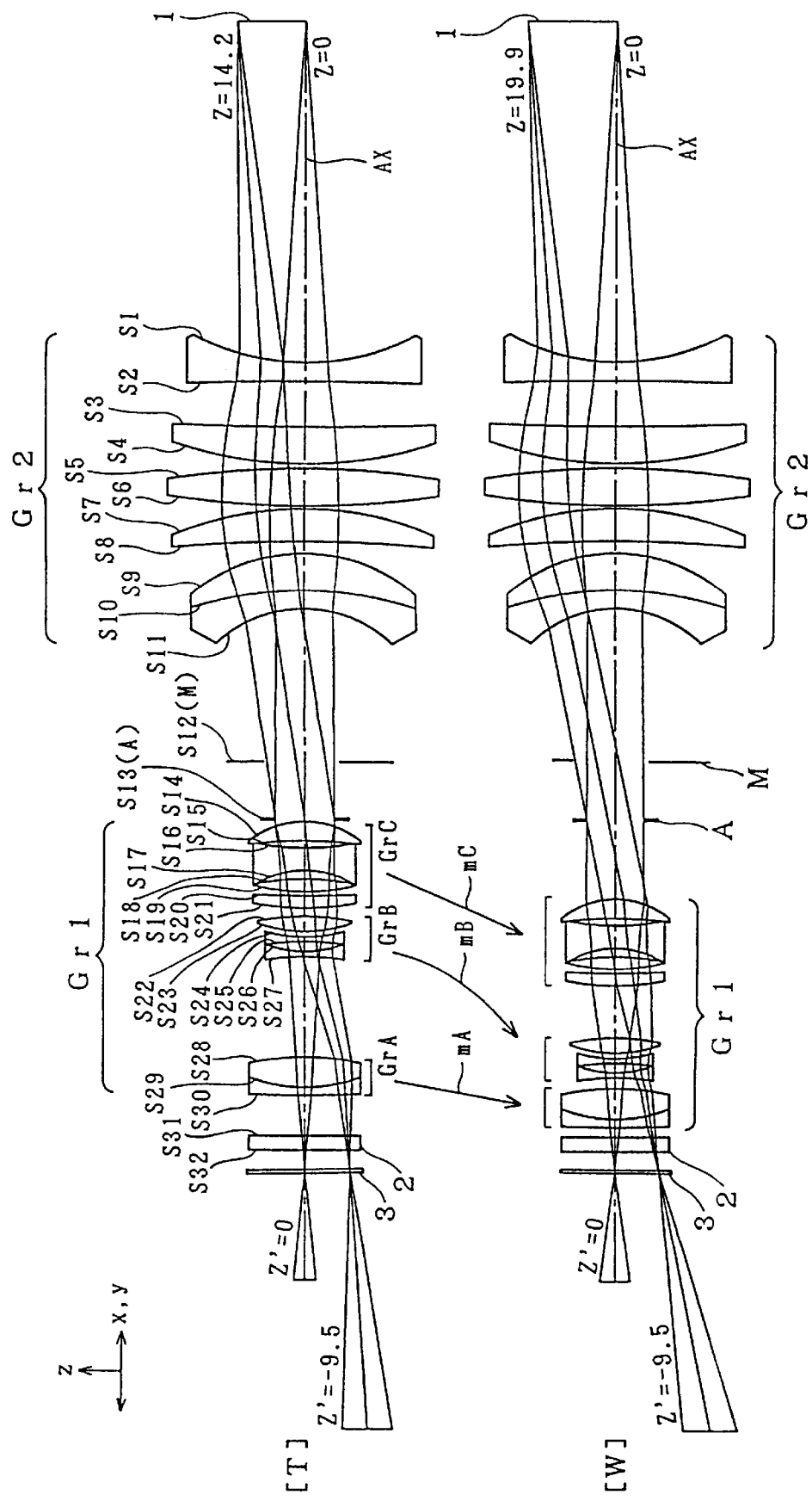
FIG. 12 is a cross-sectional view in the sub scanning direction showing the lens arrangement of the fourth embodiment at a high magnification condition and at a low magnification condition.
Figure 13:
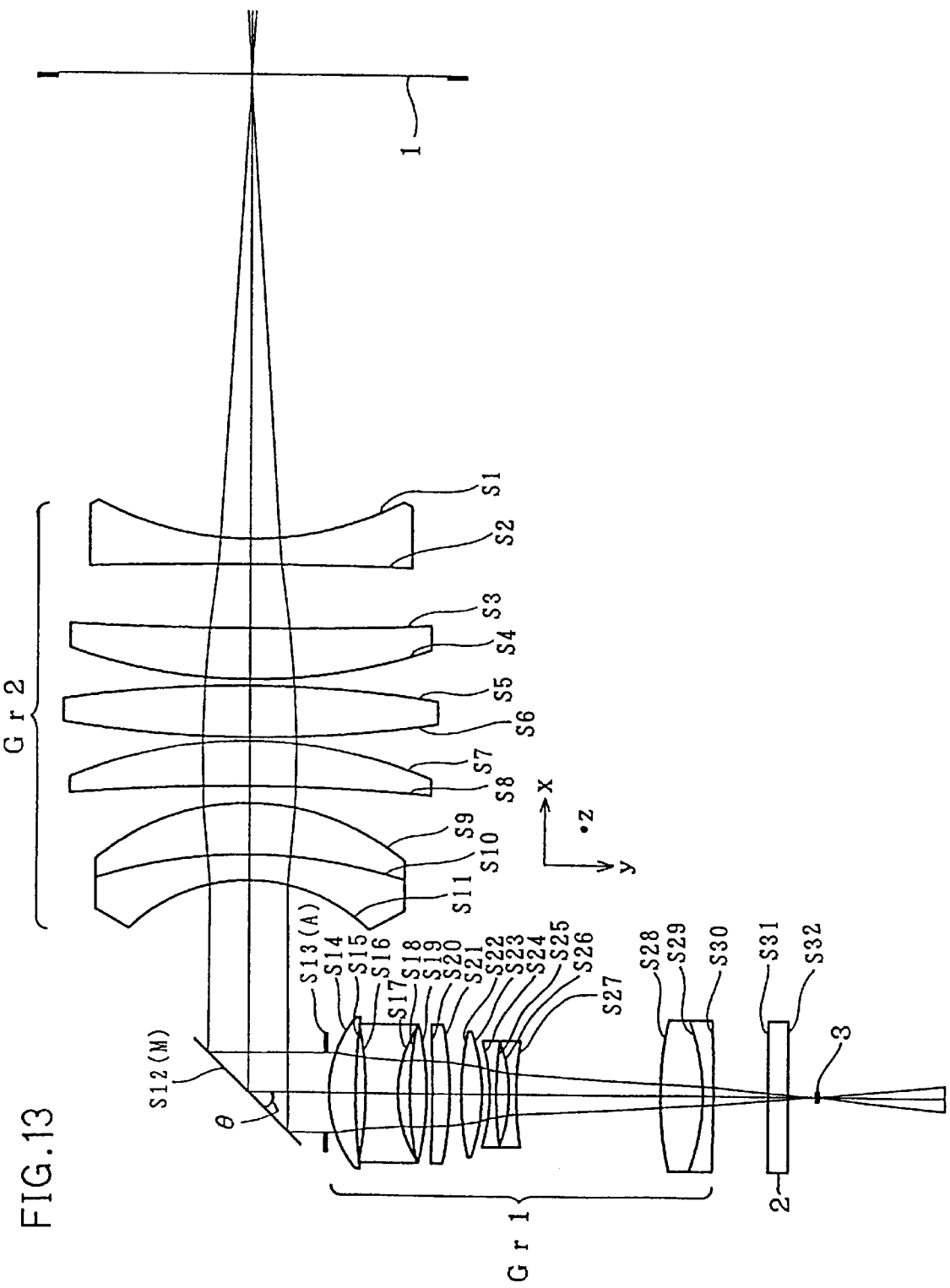
FIG. 13 is a cross-sectional view in the main scanning direction showing the lens arrangement of the fifth embodiment at a mirror rotation angle θ of 45 degrees.
Figure 14:
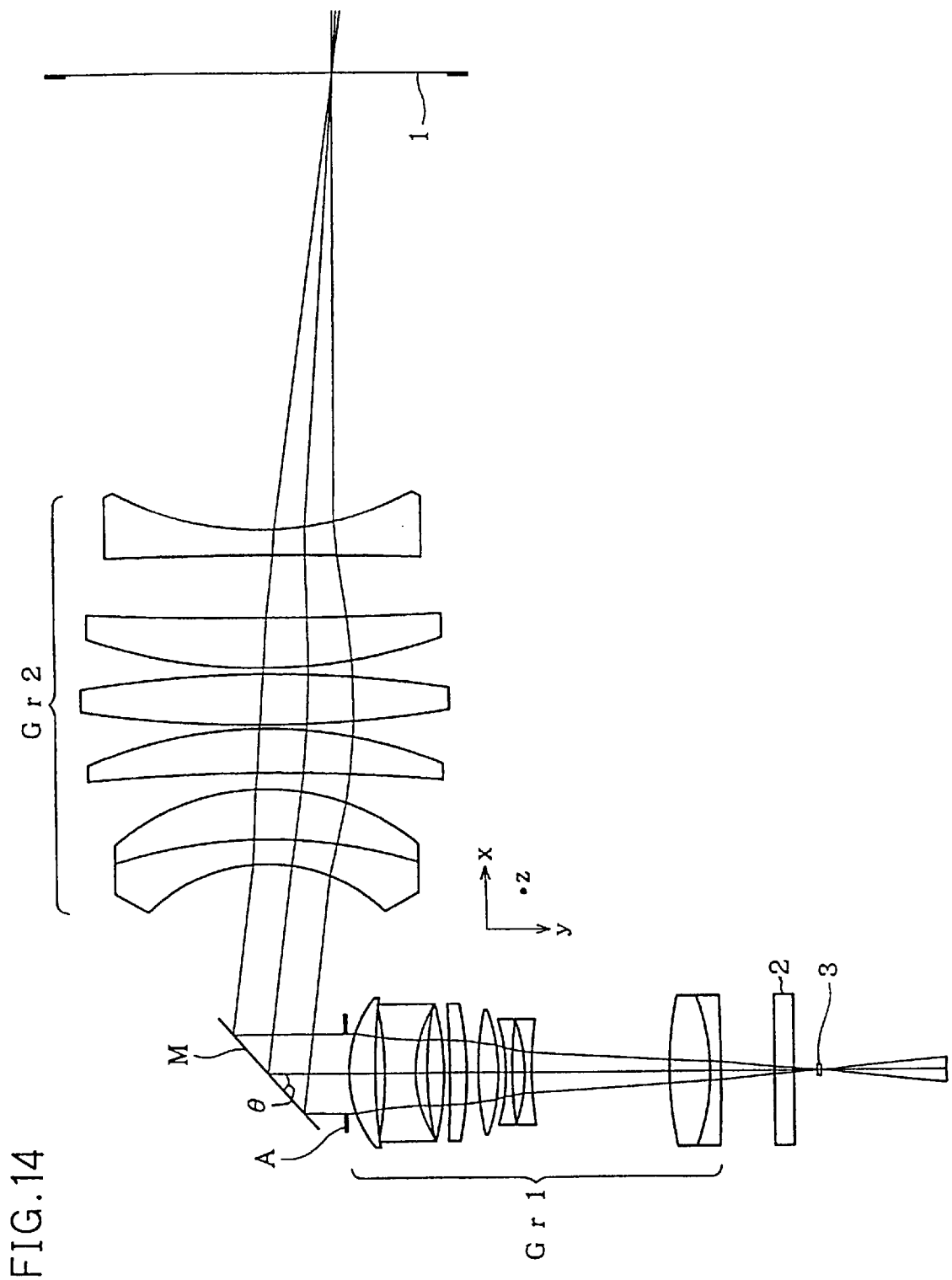
FIG. 14 is a cross-sectional view in the main scanning direction showing the lens arrangement of the fifth embodiment at a mirror rotation angle θ of 48.5 degrees.
Figure 15:
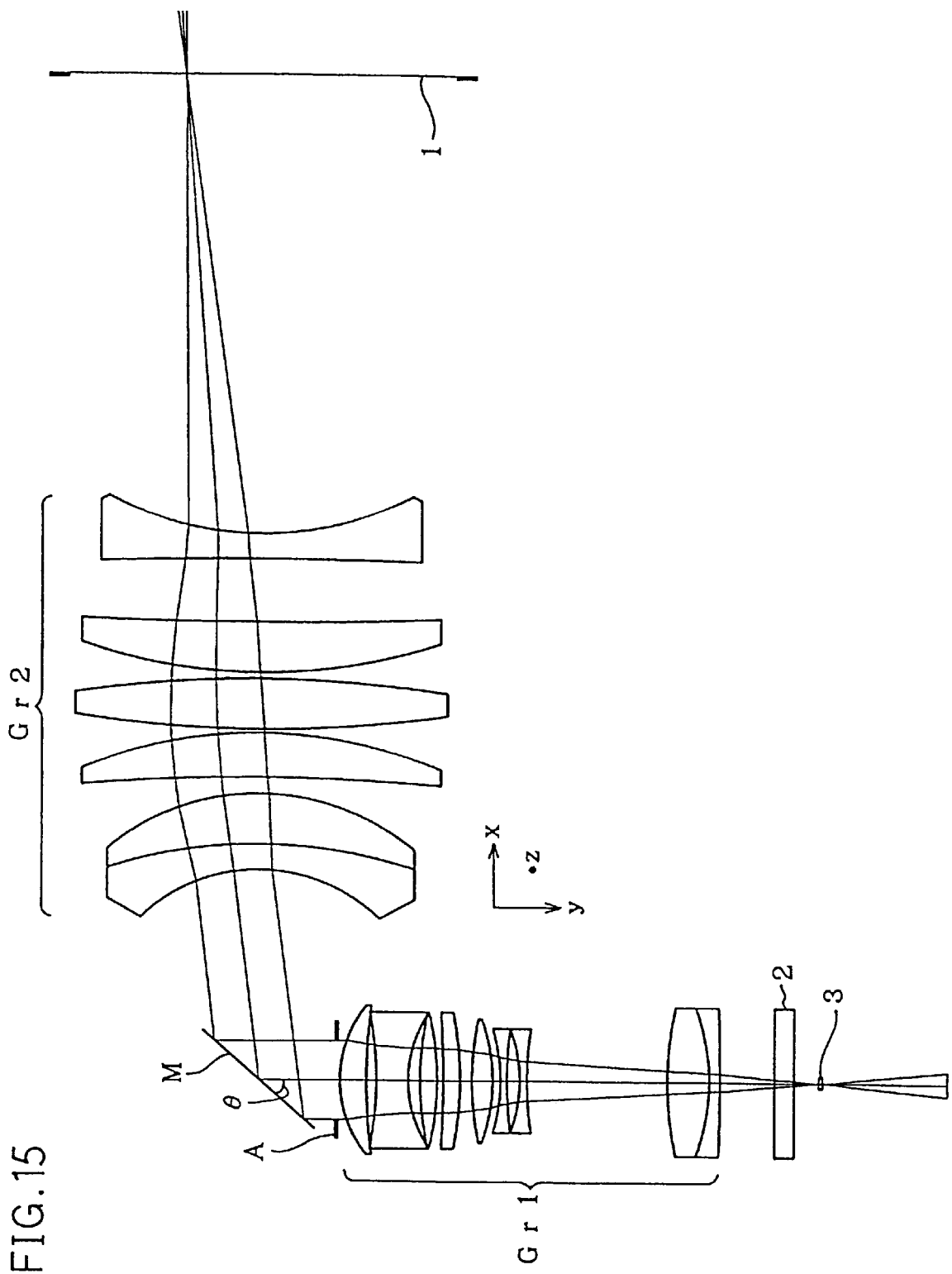
FIG. 15 is a cross-sectional view in the main scanning direction showing the lens arrangement of the fifth embodiment at a mirror rotation angle θ of 41.5 degrees.

FIG. 12 shows an x, y-z cross section (i.e. cross section in the sub scanning direction) of the fourth embodiment developed in the directions of the X- and Y-axes. In the figure, [T] shows the optical path developed in the directions of the X- and Y-axes at a high magnification condition (telephoto limit) and [W] shows that at a low magnification condition (wide angle limit). FIGS. 13 to 15 are x-y cross sections (i.e. cross sections in the main scanning direction) of the fifth embodiment. FIG. 13 shows the optical path at a mirror rotation angle (mirror swing angle) θ of 45 degrees (at this time, the object height Y=0). FIG. 14 shows the optical path at a mirror rotation angle θ of 48.5 degrees. FIG. 15 shows the optical path at a mirror rotation angle θ of 41.5 degrees. In FIGS. 12 and 13, Si (i=1, 2, 3, . . . ) represents an ith surface counted from the object (film image plane 1) side.

In the fourth and fifth embodiments, the image side lens unit Gr1 includes nine rotationally symmetrical spherical lens elements and the object side lens unit Gr2 includes six rotationally symmetrical spherical lens elements. The mirror M is provided on the image side of the object side lens unit Gr2. The aperture diaphragm A is provided between the mirror M and the image side lens unit Gr1. The filter 2 is provided on the image side of the image side lens unit Gr1 (on the side of the line CCD 3). While the fourth and fifth embodiments are arranged so that parallel light is incident on the mirror M, they may be arranged so that convergent or divergent light is incident on the mirror M.

The lens elements included in the object side lens unit Gr2 have their y-z cross sections formed circular so that the luminous flux is covered with respect to both the Y- and Z-axes. Similarly, the lens elements included in the image side lens unit Gr1 have their x-z cross sections formed circular so that the luminous flux is covered with respect to both the X- and Z-axes. However, to save the space in the scanning apparatus, it is desirable that the x-z cross section of the image side lens unit Gr1 be elongated as mentioned previously because the luminous flux is necessarily covered only with respect to the sub scanning direction (the direction of the Z-axis) which is the direction in which the light receiving devices of the line CCD 3 are arranged.

In the fourth and fifth embodiments, like in the first to third embodiments, the exit pupil of the object side lens unit Gr2 and the entrance pupil of the image side lens unit Gr1 substantially coincide with each other. For this reason, the axial light and the off-axial light having passed through the exit pupil of the object side lens unit Gr2 are all incident on the entrance pupil of the image side lens unit Gr1 and are all transmitted from the object side lens unit Gr2 to the image side lens unit Gr1. Consequently, the axial light and the off-axial light in the sub scanning direction deflected by the mirror M are both imaged on the image side surface of the line CCD 3 by the image side lens unit Gr1.

By thus arranging the lens system so that the exit pupil of the object side lens unit Gr2 and the entrance pupil of the image side lens unit Gr1 substantially coincide with each other, like in the first to third embodiments, the object side lens unit Gr2 and the image side lens unit Gr1 constitute one lens system having a common pupil. The object side lens unit Gr2 and the image side lens unit Gr1 each include only rotationally symmetrical spherical lens elements and have the field of curvature excellently corrected. Therefore, no curvature is caused in the image plane with respect to the entire scanning optical system. By thus forming the object side lens unit Gr2 and the image side lens unit Gr1 of rotationally symmetrical spherical lens elements which are inexpensive and easy to manufacture, the cost reduction of the scanning apparatus is achieved. In addition, since the scanning optical system including only spherical lens elements is simple in structure, the rotation speed of the mirror M is readily increased. As a result, the image of one frame of the 135 film is captured in approximately 0.2 to one second.

In the case where the main scanning of the film image plane 1 is performed by deflecting the light with the mirror M, if the mirror M functions as the aperture diaphragm for restricting the luminous flux, the projection changes with a change in angle between the mirror M and the luminous flux. The quantity of the light incident on the image side lens unit Gr1 changes with the change of the projection. For example, the quantity of the light received by the mirror M increases as the mirror rotation angle θ increases, and conversely, the quantity of the light received by the mirror M decreases as the mirror rotation angle θ decreases. Consequently, non-uniformity of light quantity is caused in the image captured by the line CCD 3.

According to the arrangement of the fourth and fifth embodiments, like the second and third embodiments, since the aperture diaphragm A is disposed between the image side lens unit Gr1 and the mirror M, the luminous flux reflected without being restricted by the mirror M is restricted by the aperture diaphragm A. Consequently, the quantity of the light incident on the image side lens unit Gr1 is uniform, so that the illuminance distribution (i.e. the illuminance distribution on the image side surface of the line CCD 3) is prevented from deteriorating. In the case where the aperture diaphragm A is disposed between the object side lens unit Gr2 and the mirror M, the luminous flux is eclipsed in the main scanning.

As described above, when the main scanning of the film image plane 1 is performed by the mirror M, the optical path in the object side lens unit Gr2 changes. That is, in the main scanning direction, even if the light incident on the object side lens unit Gr2 is off-axial light, the light is incident on the image side lens unit Gr1 as axial light. However, since the object side lens unit Gr2 and the image side lens unit Gr1 each satisfy an image quality as an independent front aperture lens system with the aperture diaphragm A functioning as the front aperture, a sufficient image quality is obtained with the entire scanning optical system.

The image side lens unit Gr1 is substantially telecentric to the image side and is therefore suitable for an arrangement where a line sensor such as a multi-plate (e.g. three-plate) line CCD is used as the image capturing portion. This is because the more telecentric the image side lens unit Gr1 is to the image side, the more excellently the angle characteristic matches with that of the dichroic film of the multi-color separation prism (e.g. three-color separation prism). In the case where the light incident on the object side lens unit Gr2 forms an angle to the optical axis, the illuminance distribution deteriorates according to the cosine fourth power law. However, the object side lens unit Gr2 is substantially telecentric to the object side and is therefore advantageous in preventing the illuminance distribution from deteriorating.

Fourth Embodiment

The fourth embodiment is characterized in that a zoom optical system is used as the image side lens unit Gr1 in which the optical path does not change in the main scanning. In the fourth embodiment, a zoom optical system having three zoom units GrA, GrB and GrC is used as the image side lens unit Gr1. Zooming is performed by moving the zoom units GrA, GrB and GrC in the direction of the optical axis AX. In FIG. 12, arrows mA, mB and mC show movements for zooming of the zoom units GrA, GrB and GrC from the high magnification condition [T] to the low magnification condition [W].

According to the arrangement of the present scanning optical system, the axial light and the off-axial light in the sub scanning direction are both imaged on the image side surface of the line CCD 3 and the zoom optical system used as the image side lens unit Gr1 forms images enlarged or reduced in the sub scanning direction (the direction of the Z-axis) on the image side surface of the line CCD 3 through zooming, so that zooming only in the sub scanning direction (the direction of the Z-axis) is achieved (i.e. anisotropic magnification is achieved). Since zooming is performed by the zoom optical system, the conjugate distance never changes in the zooming. Therefore, by using the present scanning optical system, the size of the scanning apparatus is effectively reduced. In addition, since the optical path does not change in the main scanning in the image side lens unit Gr1 which is a zoom optical system, the luminous flux is not restricted in the main scanning.

Since it is unnecessary to process afterwards the images formed on the image side surface of the line CCD 3 (i.e. captured images), images enlarged or reduced in the sub scanning direction are easily obtained. Consequently, convenience increases and the captured images are flexibly treated. Because of the simple arrangement where the zoom optical system formed of inexpensive and easily manufactured rotationally symmetrical spherical lens elements is used as the image side lens unit Gr1, by using the present scanning optical system, the cost of the scanning apparatus is effectively reduced.

Fifth Embodiment

The fifth embodiment is characterized in that the speed of the main scanning by the mirror M is set constant and changeable. The main scanning of the film image plane 1 at the high magnification condition [T] is performed by rotating the mirror M in the main scanning range of θ=41.5 to 48.5 degrees. Zooming is performed by changing the speed of the main scanning.

According to the arrangement of the present scanning optical system, since the speed and range of the main scanning by the mirror M is changeable, zooming only in the main scanning direction (the direction of the Y-axis) is achieved (i.e. anisotropic magnification is achieved) by setting desired main scanning speed and range. For example, enlarged images are captured by setting the scanning speed to be low, and conversely, reduced images are captured by setting the main scanning speed to be high.

Since the main scanning speed is changed by changing the rotation angular velocity of the mirror M, the main scanning speed is set by setting the rotation angular velocity of the mirror M. The main scanning range is set by setting the rotation range of the mirror M. Thus, the main scanning speed and the main scanning range are controlled only by controlling the rotation of the mirror M. Since the main scanning speed to be controlled is constant, there is no distortion in the main scanning direction in the obtained image. This is because no distortion is caused in the main scanning direction if the main scanning speed is set constant by controlling the rotation angular velocity of the mirror M.

Since it is unnecessary to process afterwards the images formed on the image side surface of the line CCD 3 (i.e. captured images), images enlarged or reduced in the main scanning direction are easily obtained. Consequently, convenience increases and the captured images are flexibly treated. Because of the simple arrangement where the lens units Gr1 and Gr2 are formed of inexpensive and easily manufactured rotationally symmetrical spherical lens elements and zooming in the main scanning direction is performed only by controlling the rotation of the mirror, by using the present scanning optical system, the cost of the scanning apparatus is effectively reduced.

<Combination of Fourth and Fifth Embodiments>

The above-described zooming arrangements of the fourth and fifth embodiments may be combined so that the zooming operations are simultaneously performed. By simultaneously performing the zooming in the sub scanning direction by use of the zoom optical system in the fourth embodiment and the zooming in the main scanning direction by controlling the main scanning speed in the fifth embodiment, zooming is performed in both the main and sub scanning directions, and isotropic/anisotropic magnification and high magnification are simultaneously achieved.

Table 5 shows construction data of the fourth and fifth embodiments (FIGS. 12 to 15). In each table, Si (i=1, 2, 3, . . . ) represents an ith surface counted from the object side, ri (i=1, 2, 3, . . . ) represents the radius of curvature of an ith surface Si counted from the object side, di (i=1, 2, 3, . . . ) represents an ith axial distance counted from the object side, and Ni (i=1, 2, 3, . . . ) represents a refractive index (Nd) to the d-line of an ith lens counted from the object side.

In the table, the axial distances varied during zooming are actual axial distances among the zoom lens units GrA, GrB and GrC at the high magnification condition [T], at the middle magnification (middle focal length) condition [M] and at the low magnification condition [W]. Table 5 also shows the focal lengths f and the magnifications β of the entire lens system corresponding to the conditions [T], [M] and [W] and the image side effective F-number EFFNO at a focal length f of 79.767 in the sub scanning direction (i.e. the direction of the Z-axis). Table 6 shows mirror rotation angles θ (degrees) and corresponding object heights Y (millimeters) in the main scanning direction in the fifth embodiment.

As described above, according to the fourth and fifth embodiments, like the first to third embodiments, high-speed scanning without any curvature is achieved even if the surface to be scanned is flat, and the cost reduction of the scanning apparatus is effectively achieved. According to the fourth embodiment, because of the simple arrangement where zooming in the sub scanning direction is performed by using a zoom optical system as either of the object side lens unit Gr2 and the image side lens unit Gr1 in which the optical path does not change in the main scanning direction, zooming in the sub scanning direction is achieved at low cost without resulting in an increase in size of the scanning optical system. According to the fifth embodiment, because of the simple arrangement where zooming in the main scanning direction is performed by setting the rotation speed and the rotation range of the mirror M to be changeable, zooming in the main scanning direction is achieved at low cost without resulting in an increase in size of the scanning optical system.

Additionally, according to the fourth and fifth embodiments, since it is unnecessary to process the images captured at the image side surface, convenience increases and the captured images are flexibly treated. According to the combination of the fourth and fifth embodiments, since zooming in both the main and sub scanning directions is achieved, and isotropic/anisotropic magnification and high magnification are simultaneously achieved, the captured images are more flexibly treated.

Figure 16B:
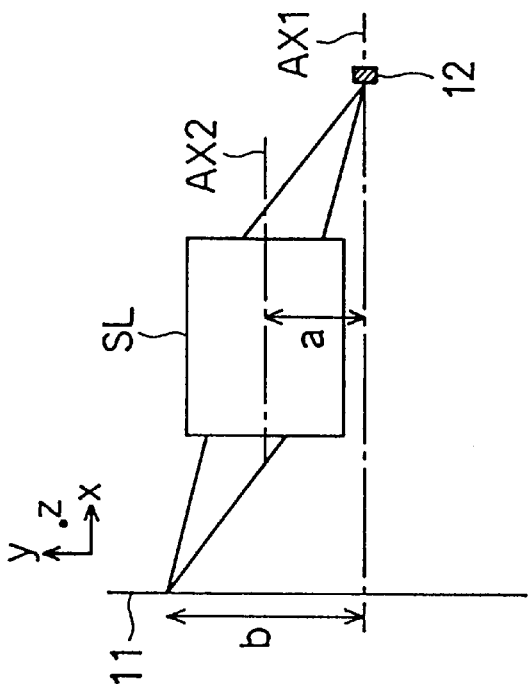
FIGS. 16A to 16C schematically show the arrangement of a scanning apparatus embodying the present invention.
Figure 16A:
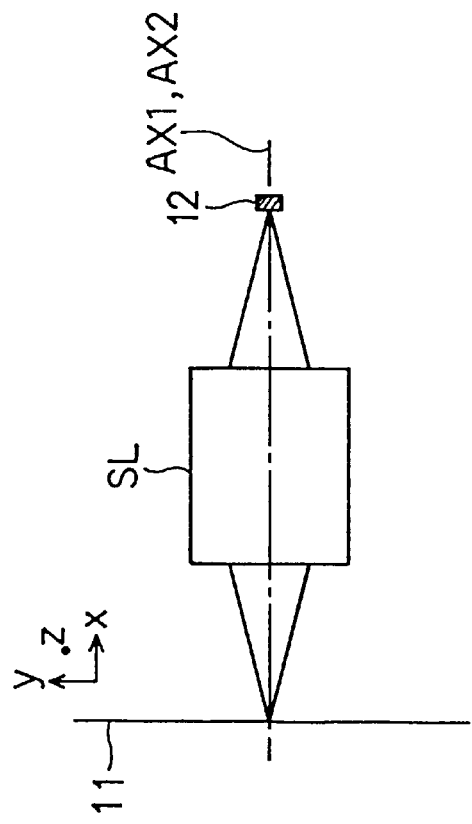
Figure 16C:
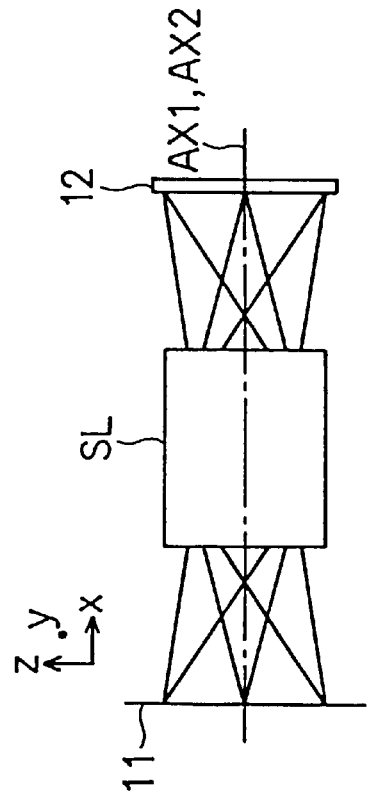

Next, a scanning apparatus provided with a lens unit SL (FIGS. 18 to 20) according to sixth to eighth embodiments will be described with reference to the drawings. FIGS. 16A to 16C schematically show the arrangement of the scanning apparatus. In the figures, the X-axis, the Y-axis and the Z-axis are axes perpendicular to one another. The X-axis is in parallel with the central axis AX1 of a film image plane 1 and the optical axis AX2 of the lens unit SL. The Y-axis is in parallel with the main scanning direction. The Z-axis is in parallel with the sub scanning direction.

As shown in FIGS. 16A to 16C, on a line CCD 12, the image of the film image plane 11 is formed by the lens unit SL. For example, when the central axis AX1 of the film image plane 11 and the optical axis AX2 of the lens unit SL coincide with each other, as is apparent from the optical path at the cross section in the main scanning direction shown in FIG. 16A and the optical path at the cross section in the sub scanning direction shown in FIG. 16C, the image of the central portion of the film image plane 11 is formed on the line CCD 12. By the line CCD 12 having its light receiving devices arranged in the direction of the Z-axis (i.e. in the sub scanning direction), an image of one line in the sub scanning direction is captured as image information.

Main scanning for image capture is achieved by moving the image of the central portion of the film image plane 1 on the line CCD 12. In conventional scanning apparatuses, main scanning for image capture is performed by the above-described swinging rotation of the mirror. On the contrary, in the present scanning apparatus, main scanning for image capture is performed by moving the lens unit SL vertically to the optical axis AX2. Since the lens unit SL may be moved in any manner as far as it is moved relatively to the film image plane 11 and to the line CCD 12, main scanning for image capture is also achieved by moving the film image plane 11 and the line CCD 12 vertically to the optical axis AX2.

FIG. 16B shows the optical path when the lens unit SL is moved vertically to the optical axis AX2 by a movement amount a. In this case, the image of the film image plane located a movement amount b (i.e. object height) away from the center of the film image plane 11 is formed on the line CCD 12. The relationship between the position of the lens unit SL and the position of the image of the film image plane 11 imaged on the line CCD 12 is represented by the following expression (1) by use of the movement amounts a and b of the positions from the condition shown in FIGS. 16A and 16C:

$$b = (1+\beta) \times a \quad (1)$$

where a is the movement amount of the lens unit SL (i.e. the distance from the central axis AX1 of the film image plane 11 to the optical axis AX2 of the lens unit SL), b is the movement amount of the position of the image on the film image plane 11 captured by the line CCD 12, and β is the magnification of the lens unit SL.

From the expression (1), it is understood that the movement amount b of the position of the image on the film image plane 11 captured by the line CCD 12 increases as the magnification β of the lens unit SL increases. Therefore, when a film image plane 11 of a predetermined size is scanned, the greater the magnification β of the lens unit SL is, the smaller the necessary movement amount a of the lens unit SL is. Because the smaller the movement amount a of the lens unit SL is, the more easily the speed of image information capture is increased, it is desirable to use in the present scanning apparatus a lens unit SL having a magnification β as high as possible. By thus selecting a lens unit SL having an appropriate magnification β, for example, the image of one frame of the 135 film is captured in one to five seconds. In addition, since an inexpensive spherical lens system may be used as the lens unit SL and the movement of the lens unit SL is linear, the cost reduction of the scanning apparatus is achieved.

Figure 17A:
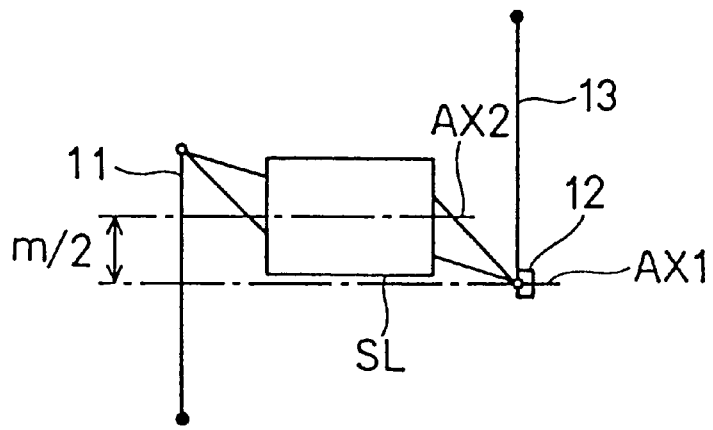
FIGS. 17A to 17C schematically show the arrangement when film images are captured at unity magnification by the scanning apparatus of FIGS. 16A to 16C.
Figure 17B:
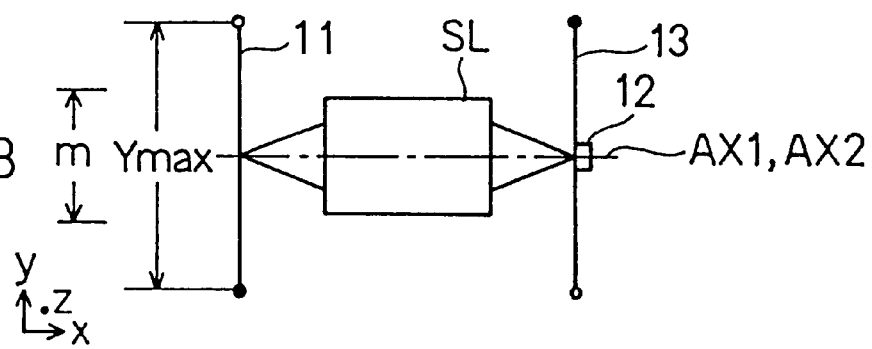
Figure 17C:
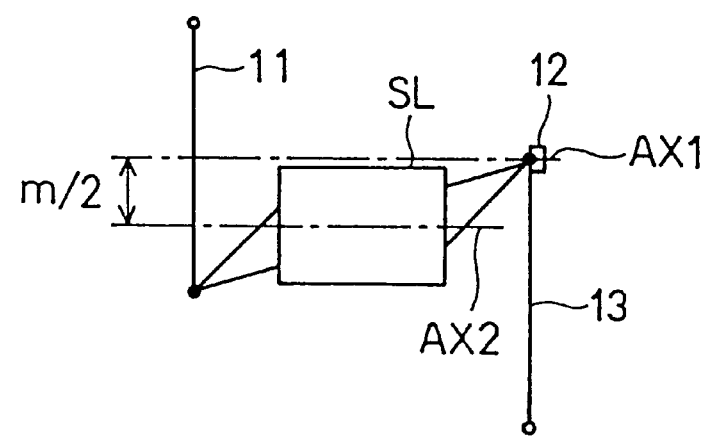

FIGS. 17A to 17C show the positions of the image on the film image plane 11 captured by the line CCD 12 when the scanning apparatus of FIGS. 16A to 16C is a unity magnification system (β=1). Reference numeral 13 is an image plane. Since this is a unity magnification system, b=2×a according to the expression (1). Therefore, the movement amount m of the lens unit SL is necessarily half the size (i.e. main scanning range) Ymax of the film image plane 11 to be captured (m=Ymax/2).

To obtain an excellent image quality from the center to the corner of the film image plane 11, it is desirable to use a lens unit SL realizing an excellent image quality. The lens construction of such a lens unit SL will be described later in detail.

It is desirable that the lens unit SL be telecentric or substantially telecentric to the side of the line CCD 12. In that case, the advantage is obtained that when a line CCD 12 such as a multi-plate (e.g. three-plate) CCD is used as the image capturing portion, the more telecentric the lens unit SL is to the side of the line CCD 12, the more excellently the angle characteristic matches with that of the dichroic film of the multi-color separation prism (e.g. three-color separation prism).

It is desirable that the lens unit SL be telecentric or substantially telecentric to the side of the film image plane 11. In the case where the light incident on the lens unit SL forms an angle to the optical axis AX2, the illuminance distribution deteriorates according to the cosine fourth law. In the case where an illumination system is used, the illuminance distribution also deteriorates due to a variation in matching with the illumination system caused by the movement of the lens unit SL. The more telecentric the lens unit SL is to the side of the film image plane 11, the more advantageous the scanning apparatus is in preventing the illuminance distribution from deteriorating.

While the line CCD 12 is used as the image capturing portion in the above-described scanning apparatus, another type of line sensor may be used as the image capturing portion instead of the line CCD 12, or a photoreceptor drum may be used as the image capturing portion. In the case where a photoreceptor drum is used, the photoreceptor drum is disposed so that its generatrix is in parallel with the sub scanning direction.

While the above-described scanning apparatus is suitable for use as a film scanner, the scanning apparatus of the present invention may be used as other types of scanning apparatuses. For example, instead of the line CCD 12, an apparatus (e.g. an LED array or a transmission-type LCD panel) may be disposed which emits light including image information, and instead of the film image plane 11, a light receiving apparatus (e.g. an area CCD or a plane-form photoreceptor) may be provided which receives, reads and records light including image information.

Tables 7 to 9 show construction data of the sixth to eighth embodiments. In each table, Si (i=1, 2, 3, . . . ) represents an ith surface counted from the object side, ri (i=1, 2, 3, . . . ) represents the radius of curvature of an ith surface Si counted from the object side, di (i=1, 2, 3, . . . ) represents an ith axial distance counted from the object side, and Ni (i=1, 2, 3, . . . ) represents a refractive index (Nd) to the d-line of an ith lens counted from the object side. These tables also show the focal length f and the magnification β of the entire lens system, the image side effective F-number EFFNO, and the object distance S1.

Table 10 shows with respect to the lens unit SL of each of the sixth to eighth embodiments the movement amount b (millimeters) of the position of the image of the film image plane 11 captured by the line CCD 12 when the lens unit SL is moved by the movement amount a (millimeters) from the central axis AX1 of the film image plane 11 vertically to the optical axis AX2.

Figure 18:
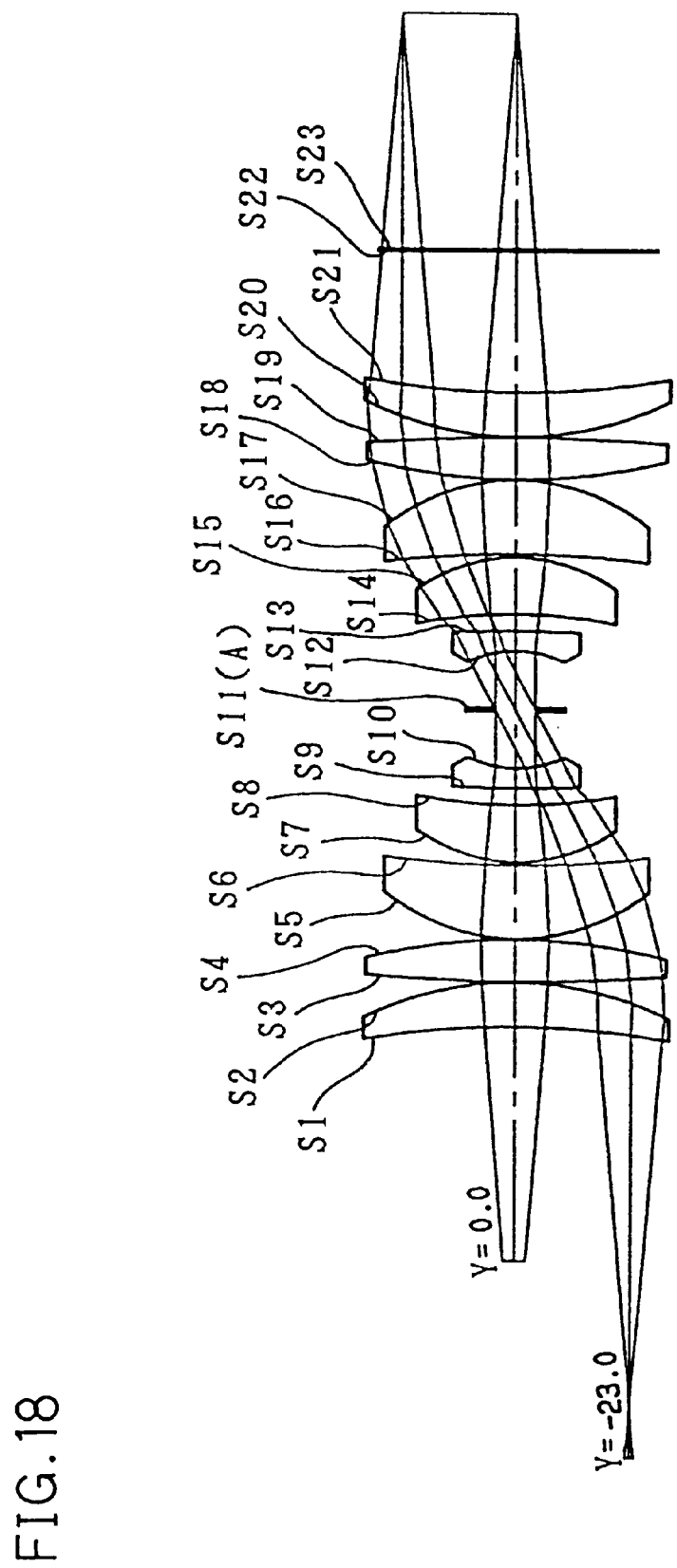
FIG. 18 shows the lens arrangement of a lens unit of a sixth embodiment used in the scanning apparatus of FIGS. 16A to 16C and 17A to 17C.
Figure 19:
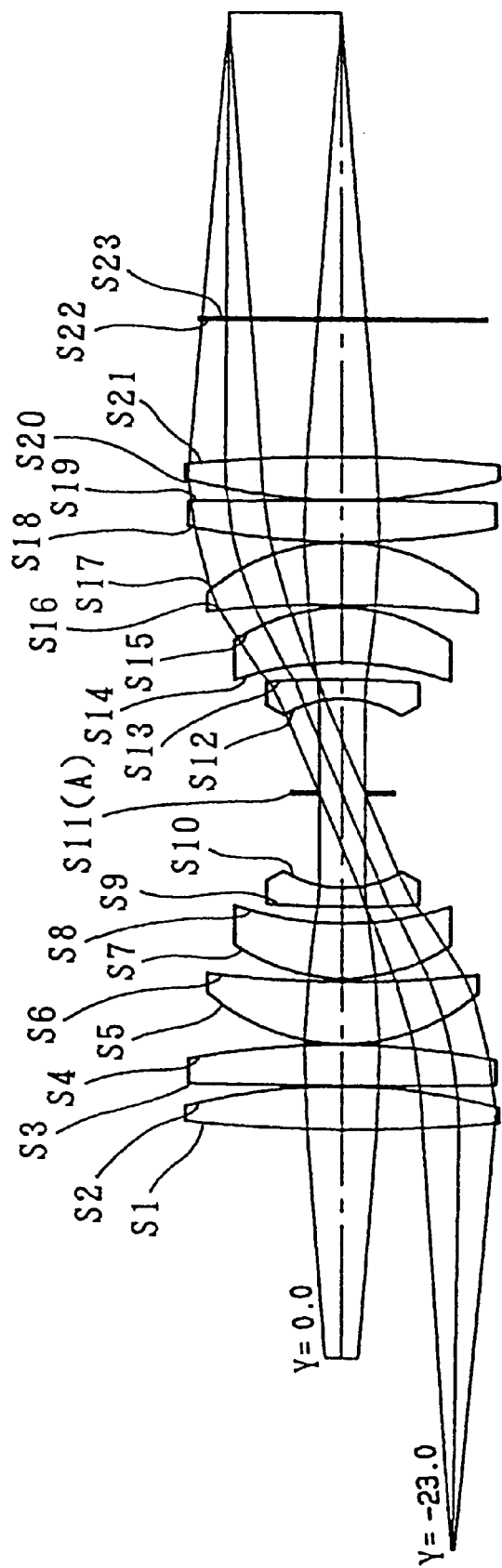
FIG. 19 shows the lens arrangement of a lens unit of a seventh embodiment used in the scanning apparatus of FIGS. 16A to 16C and 17A to 17C.
Figure 20:
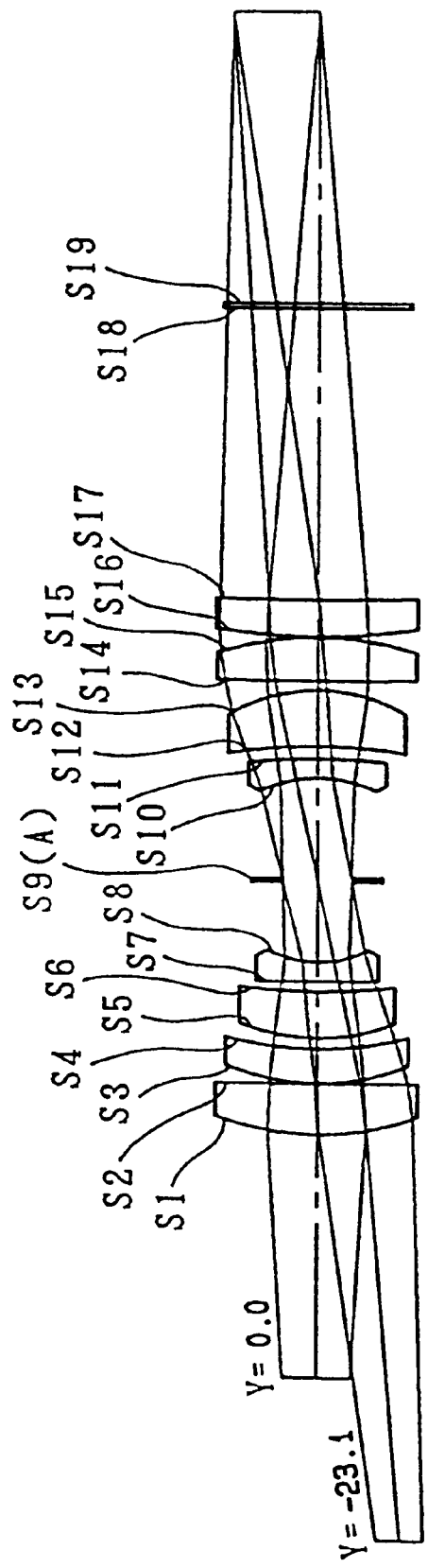
FIG. 20 shows the lens arrangement of a lens unit of an eighth embodiment used in the scanning apparatus of FIGS. 16A to 16C and 17A to 17C.

FIGS. 18 to 20 show lens arrangements of the lens units SL of the sixth to eighth embodiments, respectively. In the figures, Y is the object height (millimeters). Hereinafter, the lens arrangements of the sixth to eighth embodiments will be described.

In the sixth embodiment, the lens unit SL has, from the object (film image plane 11) side, a positive meniscus lens convex to the image side, a positive bi-convex lens, two positive meniscus lenses convex to the object side, a negative meniscus lens concave to the image side, an aperture diaphragm A, a negative meniscus lens concave to the object side, two positive meniscus lenses convex to the image side, a positive bi-convex lens, a positive meniscus lens convex to the object side, and a filter.

In the seventh embodiment, the lens unit SL has, from the object (film image plane 11) side, two positive bi-convex lenses, two positive meniscus lenses convex to the object side, a negative meniscus lens concave to the image side, an aperture diaphragm A, a negative meniscus lens concave to the object side, two positive meniscus lenses convex to the image side, two positive bi-convex lenses, and a filter.

In the eighth embodiment, the lens unit SL has, from the object (film image plane 11) side, three positive meniscus lenses convex to the object side, a negative meniscus lens concave to the image side, an aperture diaphragm A, a negative meniscus lens concave to the object side, a positive meniscus lens convex to the image side, a positive bi-convex lens, a positive meniscus lens convex to the object side, and a filter.

As described above, the lens units SL of the sixth and seventh embodiments have five spherical lens elements on each side of the aperture diaphragm A, and one filter. The lens unit SL of the eighth embodiment has four spherical lens elements on each side of the aperture diaphragm A, and one filter. The lens units SL of the sixth to eighth embodiments all adopt a symmetrical structure which is advantageous in correcting aberration such as distortion with respect to the off-axial light. For this reason, the lens units SL of these embodiments realize an excellent image quality although they are formed of inexpensive spherical lens elements. In addition, since the lens units SL are telecentric or substantially telecentric to the object side and to the image side, as mentioned above, the angle characteristic excellently matches with that of the dichroic film and the illuminance distribution is effectively prevented from deteriorating.

As described above, according to the scanning optical systems of the sixth to eighth embodiments, scanning for image capture is achieved only by slightly moving the lens units. As a result, images are captured at high speed. In addition, since no mirror is necessary, the size of the lens unit is reduced. As a result, the size reduction of the scanning apparatus is achieved.

Obviously, many modifications and variations of the present invention are possible in light of the above teachings. It is therefore to be understood that within the scope of the appended claims, the invention may be practiced other than as specifically described.

TABLE 1

<< Construction Data of Embodiment 1 >>
f = 94.638, EFFNO = 7.91

| Surface | Radius of Curvature | Axial Distance | Refractive Index |
|---|---|---|---|
| S1 | r1 = −39.807 | d1 = 4.000 | N1 = 1.58913 |
| S2 | r2 = −224.184 | d2 = 10.000 | N2 = 1.58144 |
| S3 | r3 = −73.550 | d3 = 3.000 | |
| S4 | r4 = −66.229 | d4 = 10.000 | N3 = 1.67000 |
| S5 | r5 = −64.550 | d5 = 0.620 | |
| S6 | r6 = 1212.327 | d6 = 10.000 | N4 = 1.67000 |
| S7 | r7 = −105.642 | d7 = 0.620 | |
| S8 | r8 = 89.376 | d8 = 8.560 | N5 = 1.67000 |
| S9 | r9 = −3435.010 | d9 = 0.620 | |
| S10 | r10 = 43.766 | d10 = 12.000 | N6 = 1.51680 |
| S11 | r11 = 48732.943 | d11 = 3.750 | N7 = 1.80518 |
| S12 | r12 = 39.567 | d12 = 9.000 | |
| S13 | r13 = −67.327 | d13 = 4.000 | N8 = 1.67000 |
| S14 | r14 = −115.029 | d14 = 14.500 | |
| S15 | r15 = −134.934 | d15 = 2.500 | N9 = 1.80518 |
| S16 | r16 = −72.443 | d16 = 20.000 | |
| S17 | r17 = ∞(Mirror M) | d17 = 20.000 | |
| S18 | r18 = 72.443 | d18 = 2.500 | N10 = 1.80518 |
| S19 | r19 = 134.934 | d19 = 14.500 | |
| S20 | r20 = 115.029 | d20 = 4.000 | N11 = 1.67000 |
| S21 | r21 = 67.327 | d21 = 9.000 | |
| S22 | r22 = −39.567 | d22 = 3.750 | N12 = 1.80518 |
| S23 | r23 = −48732.943 | d23 = 12.000 | N13 = 1.51680 |
| S24 | r24 = −43.766 | d24 = 0.620 | |
| S25 | r25 = 3435.010 | d25 = 8.560 | N14 = 1.67000 |
| S26 | r26 = −89.376 | d26 = 0.620 | |
| S27 | r27 = 105.642 | d27 = 10.000 | N15 = 1.67000 |
| S28 | r28 = −1212.327 | d28 = 0.620 | |
| S29 | r29 = 64.550 | d29 = 10.000 | N16 = 1.67000 |
| S30 | r30 = 66.229 | d30 = 3.000 | |
| S31 | r31 = 73.550 | d31 = 10.000 | N17 = 1.58144 |
| S32 | r32 = 224.184 | d32 = 4.000 | N18 = 1.58913 |
| S33 | r33 = 39.807 | | |

TABLE 2

<< Construction Data of Embodiment 2 >>
f = 68.239, EFFNO = 3.49

| Surface | Radius of Curvature | Axial Distance | Refractive Index |
|---|---|---|---|
| S1 | r1 = −34.552 | d1 = 4.000 | N1 = 1.51680 |
| S2 | r2 = −1136.364 | d2 = 10.000 | N2 = 1.61659 |
| S3 | r3 = −135.073 | d3 = 3.000 | |
| S4 | r4 = −82.721 | d4 = 10.000 | N3 = 1.67000 |
| S5 | r5 = −50.877 | d5 = 0.620 | |
| S6 | r6 = −1145.869 | d6 = 10.000 | N4 = 1.67000 |
| S7 | r7 = −125.677 | d7 = 0.620 | |
| S8 | r8 = 85.317 | d8 = 8.560 | N5 = 1.67000 |

TABLE 2-continued

<< Construction Data of Embodiment 2 >>
f = 68.239, EFFNO = 3.49

| Surface | Radius of Curvature | Axial Distance | Refractive Index |
|---|---|---|---|
| S9 | r9 = 451.284 | d9 = 0.620 | |
| S10 | r10 = 46.069 | d10 = 12.000 | N6 = 1.51680 |
| S11 | r11 = −119.753 | d11 = 3.750 | N7 = 1.80518 |
| S12 | r12 = 47.788 | d12 = 9.000 | |
| S13 | r13 = −41.217 | d13 = 4.000 | N8 = 1.67000 |
| S14 | r14 = −62.455 | d14 = 4.000 | |
| S15 | r15 = −93.171 | d15 = 2.500 | N9 = 1.80518 |
| S16 | r16 = −47.299 | d16 = 18.000 | |
| S17 | r17 = ∞(Mirror M) | d17 = 17.000 | |
| S18 | r18 = ∞ (Aperture Diaphragm A) | d18 = 1.000 | |
| S19 | r19 = 42.128 | d19 = 1.550 | N10 = 1.84666 |
| S20 | r20 = 99.150 | d20 = 8.990 | |
| S21 | r21 = 200.000 | d21 = 2.480 | N11 = 1.67000 |
| S22 | r22 = 38.462 | d22 = 5.580 | |
| S23 | r23 = −22.073 | d23 = 2.325 | N12 = 1.80518 |
| S24 | r24 = 217.771 | d24 = 7.440 | N13 = 1.51680 |
| S25 | r25 = −28.733 | d25 = 0.384 | |
| S26 | r26 = −431.654 | d26 = 5.307 | N14 = 1.67000 |
| S27 | r27 = −35.664 | d27 = 0.384 | |
| S28 | r28 = 96.281 | d28 = 6.200 | N15 = 1.67000 |
| S29 | r29 = 2927.315 | d29 = 0.384 | |
| S30 | r30 = 37.345 | d30 = 6.200 | N16 = 1.67000 |
| S31 | r31 = 44.920 | d31 = 1.860 | |
| S32 | r32 = 45.893 | d32 = 6.200 | N17 = 1.58144 |
| S33 | r33 = 123.964 | d33 = 2.480 | N18 = 1.58913 |
| S34 | r34 = 32.678 | d34 = 30.000 | |
| S35 | r35 = ∞ | d35 = 20.600 | N19 = 1.74400 (Prism 2) |
| S36 | r36 = ∞ | d36 = 0.800 | N20 = 1.51680 (Prism 2) |
| S37 | r37 = ∞ | | |

TABLE 3

<< Construction Data of Embodiment 3 >>
f = 88.399, EFFNO = 4.99

| Surface | Radius of Curvature | Axial Distance | Refractive Index |
|---|---|---|---|
| S1 | r1 = −49.542 | d1 = 4.000 | N1 = 1.61659 |
| S2 | r2 = 844.495 | d2 = 10.000 | |
| S3 | r3 = −630.064 | d3 = 8.000 | N2 = 1.61800 |
| S4 | r4 = −83.652 | d4 = 1.000 | |
| S5 | r5 = 186.095 | d5 = 8.000 | N3 = 1.61800 |
| S6 | r6 = −186.302 | d6 = 0.620 | |
| S7 | r7 = 70.451 | d7 = 7.000 | N4 = 1.61800 |
| S8 | r8 = 312.890 | d8 = 2.620 | |
| S9 | r9 = 36.382 | d9 = 8.000 | N5 = 1.69100 |
| S10 | r10 = 76.584 | d10 = 4.000 | N6 = 1.66446 |
| S11 | r11 = 26.274 | d11 = 33.000 | |
| S12 | r12 = ∞(Mirror M) | d12 = 12.000 | |
| S13 | r13 = ∞ (Aperture Diaphragm A) | d13 = 4.500 | |
| S14 | r14 = 30.560 | d14 = 5.500 | N7 = 1.78831 |
| S15 | r15 = −51.112 | d15 = 2.200 | N8 = 1.54072 |
| S16 | r16 = 143.776 | d16 = 8.000 | |
| S17 | r17 = −33.178 | d17 = 3.000 | N9 = 1.75520 |
| S18 | r18 = 30.510 | d18 = 7.200 | |
| S19 | r19 = −63.595 | d19 = 5.000 | N10 = 1.68150 |
| S20 | r20 = −36.559 | d20 = 1.000 | |
| S21 | r21 = 79.252 | d21 = 9.000 | N11 = 1.71700 |
| S22 | r22 = −34.900 | d22 = 3.800 | |
| S23 | r23 = −34.526 | d23 = 2.800 | N12 = 1.61659 |
| S24 | r24 = 107.174 | d24 = 3.000 | |
| S25 | r25 = 90.113 | d25 = 7.000 | N13 = 1.69680 |
| S26 | r26 = −90.481 | d26 = 16.000 | |
| S27 | r27 = ∞ | d27 = 20.000 | N14 = 1.74400 (Prism 2) |

TABLE 3-continued

<< Construction Data of Embodiment 3 >>
f = 88.399, EFFNO = 4.99

| Surface | Radius of Curvature | Axial Distance | Refractive Index |
|---|---|---|---|
| S28 | r28 = ∞ | d28 = 2.400 | N15 = 1.51680 (Prism 2) |
| S29 | r29 = ∞ | d29 = 0.500 | |
| S30 | r30 = ∞ | d30 = 0.800 | N16 = 1.51680 (Cover Glass) |
| S31 | r31 = ∞ | | |

TABLE 4

| Mirror Rotation Angle θ (°) | Object Height Y (mm) | | |
|---|---|---|---|
| | Emb. 1 | Emb. 2 | Emb. 3 |
| 40 | 17.63 | 17.72 | 17.57 |
| 41 | 14.05 | 14.10 | 14.02 |
| 42 | 10.51 | 10.53 | 10.50 |
| 43 | 6.99 | 7.00 | 6.99 |
| 44 | 3.49 | 3.50 | 3.49 |
| 45 | 0 | 0 | 0 |
| 46 | −3.49 | −3.50 | −3.49 |
| 47 | −6.99 | −7.00 | −6.99 |
| 48 | −10.51 | −10.53 | −10.50 |
| 49 | −14.05 | −14.10 | −14.02 |
| 50 | −17.63 | −17.72 | −17.57 |

TABLE 5

<< Construction Data of Embodiments 4 and 5 >>
f = 70.767~63.447~53.974
β = −0.669~−0.558~−0.478
EFFNO = 4.21

| Surface | Radius of Curvature | Axial Distance | Refractive Index |
|---|---|---|---|
| S1 | r1 = −49.542 | d1 = 4.000 | N1 = 1.61659 |
| S2 | r2 = 844.495 | d2 = 10.000 | |
| S3 | r3 = −630.064 | d3 = 8.000 | N2 = 1.61800 |
| S4 | r4 = −83.652 | d4 = 1.000 | |
| S5 | r5 = 186.095 | d5 = 8.000 | N3 = 1.61800 |
| S6 | r6 = −186.302 | d6 = 0.620 | |
| S7 | r7 = 70.451 | d7 = 7.000 | N4 = 1.61800 |
| S8 | r8 = 312.890 | d8 = 2.620 | |
| S9 | r9 = 36.382 | d9 = 8.000 | N5 = 1.69100 |
| S10 | r10 = 76.584 | d10 = 4.000 | N6 = 1.66446 |
| S11 | r11 = 26.274 | d11 = 33.000 | |
| S12 | r12 = ∞(Mirror M) | d12 = 12.000 | |
| S13 | r13 = ∞ (Aperture Diaphragm A) | d13 = 0.500~11.411~16.648 | |
| S14 | r14 = 18.893 | d14 = 4.100 | N7 = 1.76200 |
| S15 | r15 = 99.555 | d15 = 1.500 | |
| S16 | r16 = −55.909 | d16 = 4.800 | N8 = 1.75520 |
| S17 | r17 = 20.006 | d17 = 1.800 | |
| S18 | r18 = 51.415 | d18 = 2.600 | N9 = 1.74350 |
| S19 | r19 = −45.455 | d19 = 0.900 | |
| S20 | r20 = −213.315 | d20 = 2.600 | N10 = 1.78100 |
| S21 | r21 = −56.193 | d21 = 1.800~6.580~11.189 | |
| S22 | r22 = 46.974 | d22 = 3.200 | N11 = 1.75690 |
| S23 | r23 = −28.957 | d23 = 1.200 | |
| S24 | r24 = −29.053 | d24 = 1.000 | N12 = 1.65446 |
| S25 | r25 = 60.000 | d25 = 2.000 | |
| S26 | r26 = −23.796 | d26 = 1.100 | N13 = 1.74000 |
| S27 | r27 = 54.165 | d27 = 21.500~9.732~2.347 | |
| S28 | r28 = 55.316 | d28 = 6.500 | N14 = 1.74400 |
| S29 | r29 = −33.011 | d29 = 1.700 | N15 = 1.60342 |
| S30 | r30 = −323.724 | d30 = 8.425~4.503~2.040 | |

TABLE 5-continued

<< Construction Data of Embodiments 4 and 5 >>
f = 70.767~63.447~53.974
β = −0.669~−0.558~−0.478
EFFNO = 4.21

| Surface | Radius of Curvature | Axial Distance | Refractive Index |
|---|---|---|---|
| S31 | r31 = ∞ | d31 = 3.000 | N16 = 1.51680 (Filter 2) |
| S32 | r32 = ∞ | Σd = 168.465~168.465~168.465 | |

TABLE 6

| Mirror Rotation Angle θ (°) | Object Height Y (mm) |
|---|---|
| 40 | 16.79 |
| 41 | 13.40 |
| 42 | 10.04 |
| 43 | 6.68 |
| 44 | 3.34 |
| 45 | 0 |
| 46 | −3.34 |
| 47 | −6.68 |
| 48 | −10.04 |
| 49 | −13.40 |
| 50 | −16.79 |

TABLE 7

<< Construction Data of Embodiment 6 >>
f = 279.805, β = −1.000, EFFNO = 6.50, S1 = −76.83

| Surface | Radius of Curvature | Axial Distance | Refractive Index |
|---|---|---|---|
| S1 | r1 = −167.383 | d1 = 4.000 | N1 = 1.51680 |
| S2 | r2 = −67.724 | d2 = 0.251 | |
| S3 | r3 = 379.082 | d3 = 8.542 | N2 = 1.51680 |
| S4 | r4 = −120.166 | d4 = 0.251 | |
| S5 | r5 = 41.277 | d5 = 15.000 | N3 = 1.51680 |
| S6 | r6 = 207.734 | d6 = 0.754 | |
| S7 | r7 = 33.786 | d7 = 11.557 | N4 = 1.51680 |
| S8 | r8 = 100.032 | d8 = 3.517 | |
| S9 | r9 = 294.632 | d9 = 4.020 | N5 = 1.75520 |
| S10 | r10 = 21.879 | d10 = 12.000 | |
| S11 | r11 = ∞ (Aperture Diaphragm A) | d11 = 12.000 | |
| S12 | r12 = −21.879 | d12 = 4.020 | N6 = 1.75520 |
| S13 | r13 = −294.632 | d13 = 3.517 | |
| S14 | r14 = −100.032 | d14 = 11.557 | N7 = 1.51680 |
| S15 | r15 = −33.786 | d15 = 0.754 | |
| S16 | r16 = −207.734 | d16 = 15.000 | N8 = 1.51680 |
| S17 | r17 = −41.277 | d17 = 0.251 | |
| S18 | r18 = 120.166 | d18 = 8.542 | N9 = 1.51680 |
| S19 | r19 = −379.082 | d19 = 0.251 | |
| S20 | r20 = 67.724 | d20 = 9.000 | N10 = 1.51680 |
| S21 | r21 = 167.383 | d21 = 28.747 | |
| S22 | r22 = ∞ | d22 = 0.533 | N11 = 1.51680 (Filter) |
| S23 | r23 = ∞ | | |

TABLE 8

<< Construction Data of Embodiment 7 >>
f = 1013.340, β = −1.000, EFFNO = 6.50, S1 = −93.08

| Surface | Radius of Curvature | Axial Distance | Refractive Index |
|---|---|---|---|
| S1 | r1 = 323.390 | d1 = 9.000 | N1 = 1.61800 |
| S2 | r2 = −123.393 | d2 = 0.251 | |

TABLE 8-continued

<< Construction Data of Embodiment 7 >>
f = 1013.340, β = −1.000, EFFNO = 6.50, S1 = −93.08

| Surface | Radius of Curvature | Axial Distance | Refractive Index |
|---|---|---|---|
| S3 | r3 = 1852.813 | d3 = 8.542 | N2 = 1.49310 |
| S4 | r4 = −165.032 | d4 = 0.251 | |
| S5 | r5 = 41.372 | d5 = 13.000 | N3 = 1.49310 |
| S6 | r6 = 235.114 | d6 = 0.754 | |
| S7 | r7 = 38.542 | d7 = 11.557 | N4 = 1.61800 |
| S8 | r8 = 68.177 | d8 = 3.517 | |
| S9 | r9 = 247.646 | d9 = 4.020 | N5 = 1.74000 |
| S10 | r10 = 22.919 | d10 = 20.000 | |
| S11 | r11 = ∞ (Aperture Diaphragm A) | d11 = 20.000 | |
| S12 | r12 = −22.919 | d12 = 4.020 | N6 = 1.74000 |
| S13 | r13 = −247.646 | d13 = 3.517 | |
| S14 | r14 = −68.177 | d14 = 11.557 | N7 = 1.61800 |
| S15 | r15 = −38.542 | d15 = 0.754 | |
| S16 | r16 = −235.114 | d16 = 13.000 | N8 = 1.49310 |
| S17 | r17 = −41.372 | d17 = 0.251 | |
| S18 | r18 = 165.032 | d18 = 8.542 | N9 = 1.49310 |
| S19 | r19 = −1852.813 | d19 = 0.251 | |
| S20 | r20 = 123.393 | d20 = 9.000 | N10 = 1.61800 |
| S21 | r21 = −323.390 | d21 = 28.747 | |
| 522 | r22 = ∞ | d22 = 0.533 | N11 = 1.51680 (Filter) |
| 523 | r23 = ∞ | | |

TABLE 9

<< Construction Data of Embodiment 8 >>
f = 127.221, β = −0.700, EFFNO = 6.19, S1 = −162.24

| Surface | Radius of Curvature | Axial Distance | Refractive Index |
|---|---|---|---|
| S1 | r1 = 53.257 | d1 = 9.887 | N1 = 1.61800 |
| S2 | r2 = 1073.295 | d2 = 0.241 | |
| S3 | r3 = 44.130 | d3 = 6.752 | N2 = 1.49310 |
| S4 | r4 = 66.381 | d4 = 2.170 | |
| S5 | r5 = 37.975 | d5 = 9.164 | N3 = 1.49310 |
| S6 | r6 = 124.632 | d6 = 1.929 | |
| S7 | r7 = 494.025 | d7 = 3.858 | N4 = 1.61950 |
| S8 | r8 = 20.134 | d8 = 16.157 | |
| S9 | r9 = ∞ (Aperture Diaphragm A) | d9 = 20.015 | |
| S10 | r10 = −25.500 | d10 = 3.858 | N5 = 1.72100 |
| S11 | r11 = −119.847 | d11 = 2.411 | |
| S12 | r12 = −103.498 | d12 = 11.093 | N6 = 1.61800 |
| S13 | r13 = −31.806 | d13 = 1.929 | |
| S14 | r14 = 10529.641 | d14 = 8.500 | N7 = 1.49310 |
| S15 | r15 = −61.224 | d15 = 0.241 | |
| S16 | r16 = 126.783 | d16 = 7.234 | N8 = 1.61800 |
| S17 | r17 = 921.073 | d17 = 57.209 | |
| S18 | r18 = ∞ | d18 = 1.061 | N9 = 1.51680 (Filter) |
| S19 | r19 = ∞ | | |

TABLE 10

| a (mm) | | −10 | −5 | 0 | 5 | 10 |
|---|---|---|---|---|---|---|
| b (mm) | Emb. 6 | −20 | −10 | 0 | 10 | 20 |
| | Emb. 7 | −20 | −10 | 0 | 10 | 20 |
| | Emb. 8 | −17 | −8.5 | 0 | 8.5 | 17 |

What is claimed is:

1. A scanning optical system for forming a linear image from a two-dimensional image, comprising, in order from the two-dimensional image side:
   an object side lens unit;
   an aperture diaphragm;
   a rotatable deflector for deflecting light passing through the object side lens unit to perform scanning for taking in a primary image formed on an object side surface, said deflector being disposed between an exit pupil of the object side lens and the aperture diaphragm, and said deflector being a plane mirror having a deflecting surface lying on a rotational axis of the mirror; and
   an image side lens unit for focusing, on an image side surface, both axial and off-axial rays with respect to a sub-scanning direction, said image side lens unit being provided so that an entrance pupil thereof substantially coincides with an exit pupil of the object side lens unit.

2. A scanning optical system as claimed in claim 1, wherein the object side lens unit and the image side lens unit each satisfy an image quality as a front aperture lens when they are regarded as independent lens units with a side of the aperture diaphragm as an object side.

3. A scanning optical system as claimed in claim 1, wherein said image side lens unit is telecentric or substantially telecentric to an image side.

4. A scanning optical system as claimed in claim 1, said object side lens unit is telecentric or substantially telecentric to an object side.

5. A scanning optical system as claimed in claim 1, wherein of the object side lens unit and the image side lens unit, the lens unit in which an optical path changes in a main scanning direction is a lens unit of an ftanθ projection method, said main scanning direction being a direction in which the light is deflected by a rotation of the mirror, and wherein a rotation speed of the mirror is changed so that a main scanning speed increases as the light becomes farther away from an optical axis in a main scanning.

6. A scanning optical system as claimed in claim 1, wherein said mirror is rotatable 360 degrees.

7. A scanning optical system as claimed in claim 1, wherein of the object side lens unit and the image side lens unit, the lens unit in which an optical path does not change in a main scanning direction is a zoom lens system, said main scanning direction being a direction in which the light is deflected by a rotation of the mirror.

8. A scanning optical system as claimed in claim 1, wherein a rotation speed of the mirror is changeable.

9. A scanning optical system as claimed in claim 1, wherein of the object side lens unit and the image side lens unit, the lens unit in which an optical path does not change in a main scanning direction is a zoom lens system, said main scanning direction being a direction in which the light is deflected by a rotation of the mirror, and wherein a rotation speed of the mirror is changeable.

10. A scanning optical apparatus comprising:
   an image providing device for providing a primary image on an object side surface;
   an object side lens unit;
   an aperture diaphragm;
   a rotatable deflector for deflecting light passing through the object side lens unit to perform scanning for taking in the primary image formed on the object side surface, said deflector being disposed between an exit pupil of the object side lens and the aperture diaphragm, and said deflector being a plane mirror having a deflecting surface on a rotational axis of the mirror;
   an image side lens unit for focusing on an image side surface both axial and off-axial rays with respect to a sub-scanning direction, said image side lens unit being provided so that an entrance pupil thereof substantially coincide with an exit pupil of the object side lens unit; and a light receiving device for receiving light focused on the image side surface by the image side lens unit.

11. A scanning optical system comprising:

an object side lens unit;

an aperture diaphragm;

a deflector for deflecting light passing through the object side lens unit to perform scanning for taking in a primary image formed on an object side surface, said deflector being disposed between an exit pupil of the object side lens unit and the aperture diaphragm; and an image side lens unit for focusing on an image side surface both axial and off-axial rays with respect to a sub scanning direction, said image side lens unit being provided so that an entrance pupil thereof substantially coincides with an exit pupil of the object side lens unit, wherein of the object side lens unit and the image side lens unit, the lens unit in which an optical path changes in a main scanning direction is a lens unit of an ftanθ projection method, said main scanning direction being a direction in which the light is deflected by a rotation of the deflector, and wherein a rotation speed of the deflector is changed so that a main scanning speed increases as the light becomes farther away from an optical axis in a main scanning.

12. A scanning optical system as in claim 11, wherein the deflector is a rotatable mirror.

13. A scanning optical system as in claim 11, wherein said object side lens unit is telecentric or substantially telecentric to an object side.

14. A scanning optical system as claimed in claim 11, wherein said image side lens unit is telecentric or substantially telecentric to an image side.

15. A scanning optical system as claimed in claim 11, wherein a zooming mode of operation is performed by changing the speed of the deflector.

16. A scanning optical system as claimed in claim 11, wherein the object side lens unit and the image side lens unit each satisfy an image quality as a front aperture lens when they are regarded as independent lens units with a side of the aperture diaphragm as an object side.

17. A scanning optical system as claimed in claim 11, wherein said deflector is rotatable 360 degrees for providing scanning.

18. A scanning optical system comprising:

an object side lens unit;

an aperture diaphragm;

a deflector for deflecting light passing through the object side lens unit to perform scanning for taking in a primary image formed on an object side surface, said deflector being disposed between an exit pupil of the object side lens unit and the aperture diaphragm; and an image side lens unit for focusing on an image surface both axial and off-axial rays with respect to a sub-scanning direction, said image side lens unit being provided so that an entrance pupil thereof substantially coincides with an exit pupil of the object side lens unit, wherein of the object side lens unit and the image side lens unit, the lens unit in which an optical path does not change in a main scanning direction is a zoom lens system, said main scanning direction being a direction in which the light is deflected by a rotation of the deflector.

19. A scanning optical system as claimed in claim 18, wherein the object side lens unit includes a plurality of spherical lens elements.

20. A scanning optical system comprising:

an object side lens unit;

an aperture diaphragm;

a mirror assembly for deflecting light passing through the object side lens unit to perform scanning for taking in a primary image formed on an object side surface, said mirror assembly being disposed between an exit pupil of the object side lens unit and the aperture diaphragm; and an image side lens unit for focusing on an image side surface both axial and off-axial rays with respect to a sub-scanning direction, said image side lens unit being provided so that an entrance pupil thereof substantially coincides with an exit pupil of the object side lens unit, wherein a rotation speed of the mirror assembly is changeable.

21. A scanning optical system as claimed in claim 20, wherein said image side lens unit is telecentric or substantially telecentric to an image side.

22. A scanning optical system as claimed in claim 20, wherein said object side lens unit is substantially telecentric or telecentric to an object side.

23. A scanning optical system comprising:

an object side lens unit;

an aperture diaphragm;

a mirror for deflecting light passing through the object side lens unit to perform scanning for taking in a primary image formed on an object side surface, said mirror being disposed between an exit pupil of the object side lens unit and the aperture diaphragm; and an image side lens unit for focusing on an image side surface both axial and off-axial rays with respect to a sub-scanning direction, said image side lens unit being provided so that an entrance pupil thereof substantially coincides with an exit pupil of the object side lens unit, wherein of the object side lens unit and image side lens unit, the lens unit in which an optical path does not change in a main scanning direction is a zoom lens system, said main scanning direction being a direction in which the light is deflected by a rotation of the mirror, and wherein the rotation speed of the mirror is changeable.

24. A scanning optical apparatus comprising:

an image providing device for providing a primary image on an object side surface;

an object side lens unit consisting of a plurality of spherical lens elements;

an aperture diaphragm;

a deflector for deflecting light passing through the object side lens unit to perform scanning for taking in a primary image formed on an object side surface, said deflector being disposed between an exit pupil of the object side lens unit and the aperture diaphragm;

an image side lens unit for focusing on an image side surface both axial and off-axial rays with respect to a sub-scanning direction, said image side lens unit being provided so that an entrance pupil thereof substantially coincides with an exit pupil of the object side lens unit and consists of a plurality of spherical lens elements; and a light receiving device for receiving light focused on the image side surface by the image side lens unit.

25. A scanning optical system comprising:

an object side lens unit;

an aperture diaphragm;

a movable flat planar facet deflector for deflecting light passing through the object side lens unit to perform scanning for taking in a primary image formed on an object side surface, said flat planar facet deflector being disposed between an exit pupil of the object side lens unit and the aperture diaphragm;

an image side lens unit of only spherical lens components for focusing on an image side surface both axial and off-axial rays with respect to a subscanning direction, said image side lens unit being provided so that an entrance pupil thereof substantially coincides with an exit pupil of the object side lens unit; and means for driving the flat planar facet deflector to perform a zooming mode of operation in a main scanning direction by changing a scanning speed of the flat planar facet deflector.

26. A scanning optical apparatus comprising:

an image providing device for providing a primary image on an object side surface;

an object side lens unit;

an aperture diaphragm;

a deflector for deflecting light passing through the object side lens unit to perform scanning across a predetermined rotational range for taking in a primary image formed on an object side surface, said deflector being rotatably disposed between an exit pupil of the object side lens unit and the aperture diaphragm;

an image side lens unit for focusing with converging rays on an image side surface both axial and off-axial rays with respect to subscanning direction, said image side lens unit being provided so that an entrance pupil thereof substantially coincides with an exit pupil of the object side lens unit;

a light receiving device for receiving light focused on the image side surface by the image side lens unit;

means for setting a rotational range of the deflector; and means for varying a scanning speed of the deflector to perform a zooming mode of operation.

* * * * *